(12) United States Patent
Mooney

(10) Patent No.: US 8,245,727 B2
(45) Date of Patent: Aug. 21, 2012

(54) FLOW CONTROL VALVE AND METHOD OF USE

(76) Inventor: Richard J. Mooney, Salt Lake City, UT (US); Pamela Mooney, legal representative, Portland, OR (US)

( * ) Notice: Subject to any disclaimer, the term of this patent is extended or adjusted under 35 U.S.C. 154(b) by 530 days.

(21) Appl. No.: 12/492,800

(22) Filed: Jun. 26, 2009

(65) Prior Publication Data

US 2010/0326533 A1    Dec. 30, 2010

(51) Int. Cl.
*F16K 7/17* (2006.01)

(52) U.S. Cl. ....... 137/625.33; 138/40; 251/25; 251/123; 251/331

(58) Field of Classification Search ............ 137/625.28, 137/625.33; 138/40; 251/25, 118, 123, 125, 251/331
See application file for complete search history.

(56) References Cited

U.S. PATENT DOCUMENTS

| | | | |
|---|---|---|---|
| 2,637,946 A | 5/1953 | Parks | |
| 3,078,066 A * | 2/1963 | Moore | 251/61.1 |
| 3,669,143 A | 6/1972 | Reese | |
| 3,792,720 A * | 2/1974 | Robbins | 137/625.28 |
| 4,050,479 A * | 9/1977 | Baumann | 138/42 |
| 4,489,756 A * | 12/1984 | Balz | 137/625.33 |
| 4,575,042 A | 3/1986 | Grimland | |
| 4,659,062 A | 4/1987 | Mooney | |
| 4,718,455 A * | 1/1988 | Dussourd et al. | 137/625.3 |
| 5,056,550 A | 10/1991 | Mooney | |
| 5,271,601 A | 12/1993 | Bonzer | |
| 5,485,984 A * | 1/1996 | Itoi et al. | 251/331 |
| 5,561,982 A | 10/1996 | Tunkel | |
| 5,582,012 A | 12/1996 | Tunkel | |
| 5,687,763 A * | 11/1997 | Steinke | 137/625.33 |
| 5,749,231 A | 5/1998 | Tunkel | |
| 5,819,541 A | 10/1998 | Tunkel | |
| 5,909,747 A * | 6/1999 | Schieber | 137/492 |
| 5,911,740 A | 6/1999 | Tunkel | |
| 5,950,436 A | 9/1999 | Tunkel | |
| 5,964,446 A * | 10/1999 | Walton et al. | 251/127 |
| 6,082,116 A | 7/2000 | Tunkel | |
| 6,095,484 A | 8/2000 | Frenkel | |
| 6,173,735 B1 | 1/2001 | Perry | |
| 6,289,679 B1 | 9/2001 | Tunkel | |
| 6,354,319 B1 | 3/2002 | Mooney | |

OTHER PUBLICATIONS

Richard J. Mooney, Mooney Flowgrid Regulator, 2001, 2004 Dresser, Inc.
Rick F. Mooney, Flexible Element Regulators, Dresser Mooney Controls, Dresser, Inc.

* cited by examiner

*Primary Examiner* — William McCalister
(74) *Attorney, Agent, or Firm* — Hayes Soloway P.C.

(57) ABSTRACT

A multistage, pilot-operated pressure regulator for pressure adjustment and/or back pressure relief and/or differential pressure or flow control applications comprises a diaphragm and a plurality of plates, including a throttle plate and at least one flow control plate. In at least one embodiment, the throttle plate includes a sloped upper surface for contacting the diaphragm, and a plurality of apertures residing within a plurality of concentric rows. In addition, in at least one embodiment, at least one flow control plate is positioned downstream of the throttle plate, the at least one flow control plate including a plurality of apertures residing within a plurality of concentric rows. A method of controlling the flow of fluid in a conduit is also provided.

22 Claims, 19 Drawing Sheets

FLOW CONTROL VALVE AND METHOD OF USE

FIELD

The present invention relates to a flow control device, and more particularly, to a valve for controlling the flow of fluid within a conduit, like a pipe line.

BACKGROUND

In controlling the transmission of fluids in oil and natural gas ($CH_4$) pipeline distribution systems, in chemical processing systems, and the like, it is often necessary to transmit the fluid at a relatively high pressure through portions of the distribution system. As the high pressure fluid travels through the distribution system, the pressure of the fluid may be reduced, typically to a controlled or selected pressure setting, at one or more points to supply the fluid at a lower pressure to a subsystem that uses or consumes the fluid.

Pilot-operated pressure regulators or flow control valves are used for pressure control and/or adjustment and/or back pressure relief and/or differential pressure and/or flow rate control applications, such as to regulate the flow of a fluid, such as natural gas, in a conduit, such as a pipeline. That is, such devices allow for controlling and/or adjusting fluid pressure and/or adjusting fluid flow between an upstream portion of the conduit and a downstream portion of the conduit.

U.S. Pat. No. 6,173,735, incorporated herein by reference in its entirety, discloses a valve having multiple throttle plates. However, among its characteristics, the valve of the '735 patent uses multiple throttle plates that are individually bolted to the valve body and are not stacked. In addition, the concentric rows of apertures within the throttle plates overlap and are not set apart by row dividers. As will be apparent from further discussion hereinafter, there are other differences that exist between the valve of the '735 patent and embodiments of the one or more present inventions.

There is a need for additional devices for adjusting and/or controlling the pressure and/or flow of fluid in a conduit to provide a relatively smooth pressure change between the upstream and downstream portions of the conduit after a pressure change and/or flow rate in at least one of the upstream or downstream portions.

In addition, present valves typically generate considerable noise as the fluid flows through them, often requiring multiple valves to be used in series to control or adjust any pressure changes in smaller, incremental steps, or other methods to reduce the noise generated. Thus, there is a need for devices or valves capable of adjusting and/or controlling the flow of fluid in a conduit at reduced noise and/or decibel levels for a given change in pressure and/or flow rate.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

Embodiments of the one or more present inventions include a multistage, pilot-operated pressure regulator or flow control valve for pressure adjustment and/or back pressure relief and/or differential pressure and/or flow control applications. The flow control valve comprises a diaphragm and a plurality of plates, including a throttle plate and at least one flow control plate. In at least one embodiment, the throttle plate includes a sloped upper surface for contacting the diaphragm, and a plurality of apertures residing within a plurality of concentric rows. In addition, in at least one embodiment, at least one flow control plate is positioned downstream of the throttle plate, the at least one flow control plate including a plurality of apertures residing within a plurality of concentric rows. A method of using the flow control valve to adjust and/or control the flow of fluid in a conduit is also provided.

As used herein, "downstream" means in the general direction of fluid flow beyond the point of reference, and "upstream" means the direction from which fluid is originating and before the point of reference.

In at least one embodiment of the one or more present inventions, a fluid control valve is operable to adjust a flow of a fluid therethrough. The fluid control valve is controlled, at least in part, by a pilot valve assembly in fluidic communication with the fluid control valve. The fluid control valve comprises a valve body, a plurality of stacked plates and a diaphragm. The valve body has a loading chamber, an interior chamber, an inlet into the interior chamber and an outlet from the interior chamber. The plurality of stacked plates are located within the interior chamber. At least one plate of the plurality of stacked plates includes a plurality of concentric rows of apertures. The diaphragm contacts a first, or uppermost, plate of the plurality of stacked plates. The diaphragm also includes a plug operatively associated with a biasing member for applying a return force to the diaphragm.

The pilot valve assembly includes a fixed orifice that together controls the pressure differential across the diaphragm. The diaphragm is urged by the fluid against the return force applied by the biasing member to allow the fluid to flow through at least one of the concentric rows of apertures located in the first plate.

In at least one embodiment, a second plate of the plurality of stacked plates comprises a plurality of concentric rows of apertures. In at least one embodiment, a size or surface area of an aperture in plan view located in a first row of the second plate is greater than a size or surface area of an aperture in plan view located in the first row of the first plate. In at least one embodiment, a row divider is located between concentric rows of apertures in the second plate of the plurality of stacked plates. In at least one embodiment, a portion of a row divider of a third plate contacts at least a portion of the row divider of the second plate. In at least one embodiment, the first plate comprises an upper sloped surface relative to its bottom surface. In at least one embodiment, the first plate comprises a variable thickness. In at least one embodiment, the apertures within a first row of the plurality of concentric rows of apertures within the first plate are smaller than the apertures within a second row of the plurality of concentric rows of apertures within the first plate. In at least one embodiment, a first radial distance as measured from a center of the first plate to the first row is less than a second radial distance as measured from the center of the first plate to the second row. In at least one embodiment, a ring devoid of concentric rows of apertures may be provided, the ring having a first outside diameter substantially equal to an outside diameter of the first plate. In at least one embodiment, a bottom-most plate of the plurality of stacked plates contacts a shoulder within the flow chamber of the valve body, the shoulder located proximate a circumferential edge of the bottom-most plate. In at least one embodiment, a continuous row divider separates two rows of the plurality of concentric rows of apertures. In at least one embodiment, other than a center hole axially aligned with the plug, there are no additional apertures within each plate of the plurality of stacked plates other than the concentric rows of apertures. In at least one embodiment, a throttle plate is used with two or more flow control plates, wherein fluid pressure drops as the fluid moves through the apertures in the flow control plates. In at least one embodiment, the plurality of stacked plates are fastened to one or more stacked plates and/or to the valve body by one or more of bolts, pins, rods, screws, clamps, and portions thereof. In at least one embodiment, the plurality of stacked plates are not fastened to one another or to the valve body by one or more of bolts, pins, rods, screws, clamps, and portions thereof.

Embodiments of the present invention are also directed at methods of controlling a flow of fluid in a conduit using a flow control valve. Accordingly, a method of controlling a flow of fluid is provided, the method comprising: providing a flow control valve for locating in fluidic communication with the conduit, the flow control valve comprising a plurality of plates having a plurality of concentrically located single rows of apertures each separated by a row divider, wherein an uppermost plate of the plurality of plates contacts a moveable diaphragm for selectively allowing fluid flow through the plurality of flow control plates, the location of the diaphragm controlled by a pilot valve in fluidic communication with the conduit and the flow control valve; allowing the flow control valve to be installed in the conduit; and adjusting a flow of fluid in the conduit using the flow control valve, wherein the pilot valve assembly that includes a fixed orifice controls the pressure differential across the diaphragm and causes the diaphragm to at least partially rise from the uppermost plate or fall against the uppermost plate to control the fluid flow through at least one of the concentric rows of apertures located in the uppermost plate.

Embodiments of the one or more present inventions may comprise any one or more of the novel features described herein, including in the Detailed Description, and/or shown in the drawings. By way of example and not limitation, embodiments may be directed to a combination of elements described herein, such as a plurality of flow control plates for use in an interior chamber of a fluid control valve, wherein a diaphragm is movable within the interior chamber. In such a combination, the plurality of flow control plates may comprise an uppermost throttle plate comprising a plurality of concentric rows of apertures, wherein an upper surface of the throttle plate is adapted to be seated against the diaphragm. At least one flow control plate is located adjacent the throttle plate and/ or a spacer and includes a plurality of concentric single rows of apertures.

Various embodiments of the one or more present inventions have application for controlling both gases and liquids.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are and will be understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, reference to specific embodiments thereof are illustrated in the appended drawings. The drawings depict only typical embodiments and are therefore not to be considered limiting. One or more embodiments will be described and explained with additional specificity and detail through the use of the accompanying drawings in which.

The drawings are not necessarily to scale.

DETAILED DESCRIPTION

At least one embodiment of the one or more present inventions includes a fluid control valve for controlling the flow of fluid through a conveyance system, such as pipeline. More particularly, and as described in detail below, at least one embodiment comprises a fluid control valve that uses one or more plates having a plurality of openings for controlling fluid flow from an inlet side to an outlet side of the valve.

Figure 1:
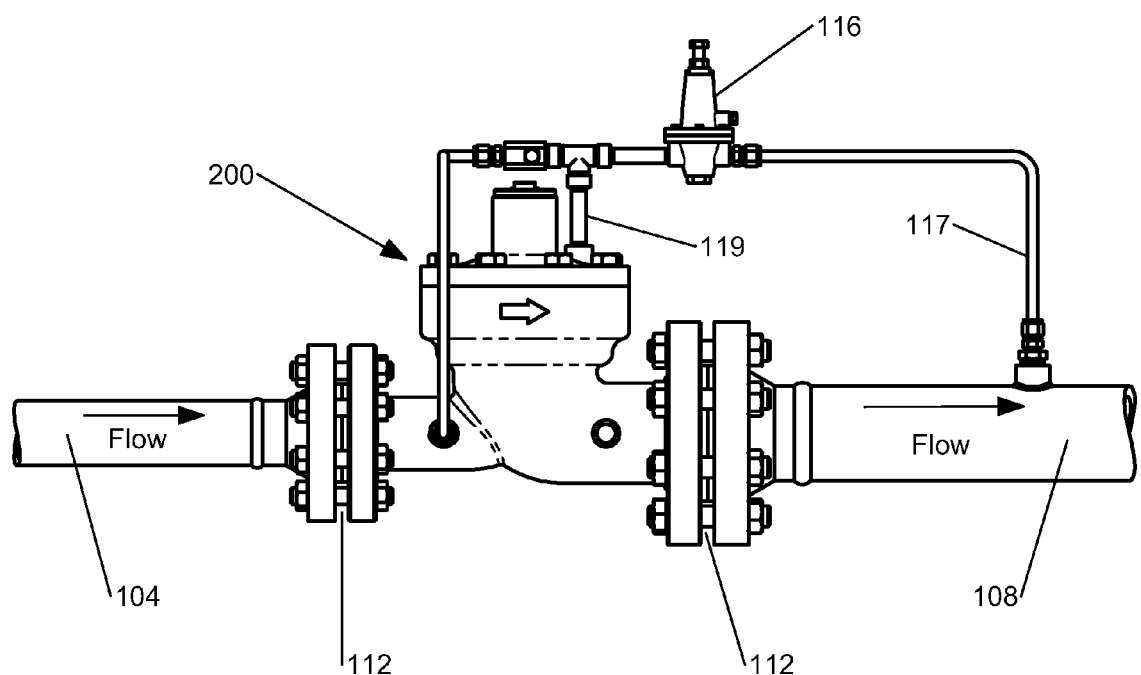
FIG. 1 is a side elevation view of an embodiment of a flow control valve, including adjacent conveyance piping or conduits and associated fittings.

Referring now to FIG. 1, a control valve 200 in accordance with at least one embodiment of the one or more present inventions is shown. The control valve 200 is situated between an inlet conduit 104 and an outlet conduit 108. The control valve 200 is connected to the inlet conduit 104 and the outlet conduit 108, such as by means of flange fittings 112. Optional, rather than flange fittings 112, the control valve 200 can be welded, threaded, bolted, or connected by other means known in the art to the inlet conduit 104 and the outlet conduit 108. The control valve 200 may, at least in part, be controlled by a pilot valve assembly 116, such as pilot valves known to those skilled in the art, including, but not limited to the pilot valve(s) described in U.S. Pat. No. 5,056,550 and/or U.S. Pat. No. 6,354,319, the contents of which are incorporated herein by reference in their entirety for all purposes. In addition, the content of U.S. Pat. No. 4,659,062 is also incorporated herein in its entirety by reference.

Figure 2A:
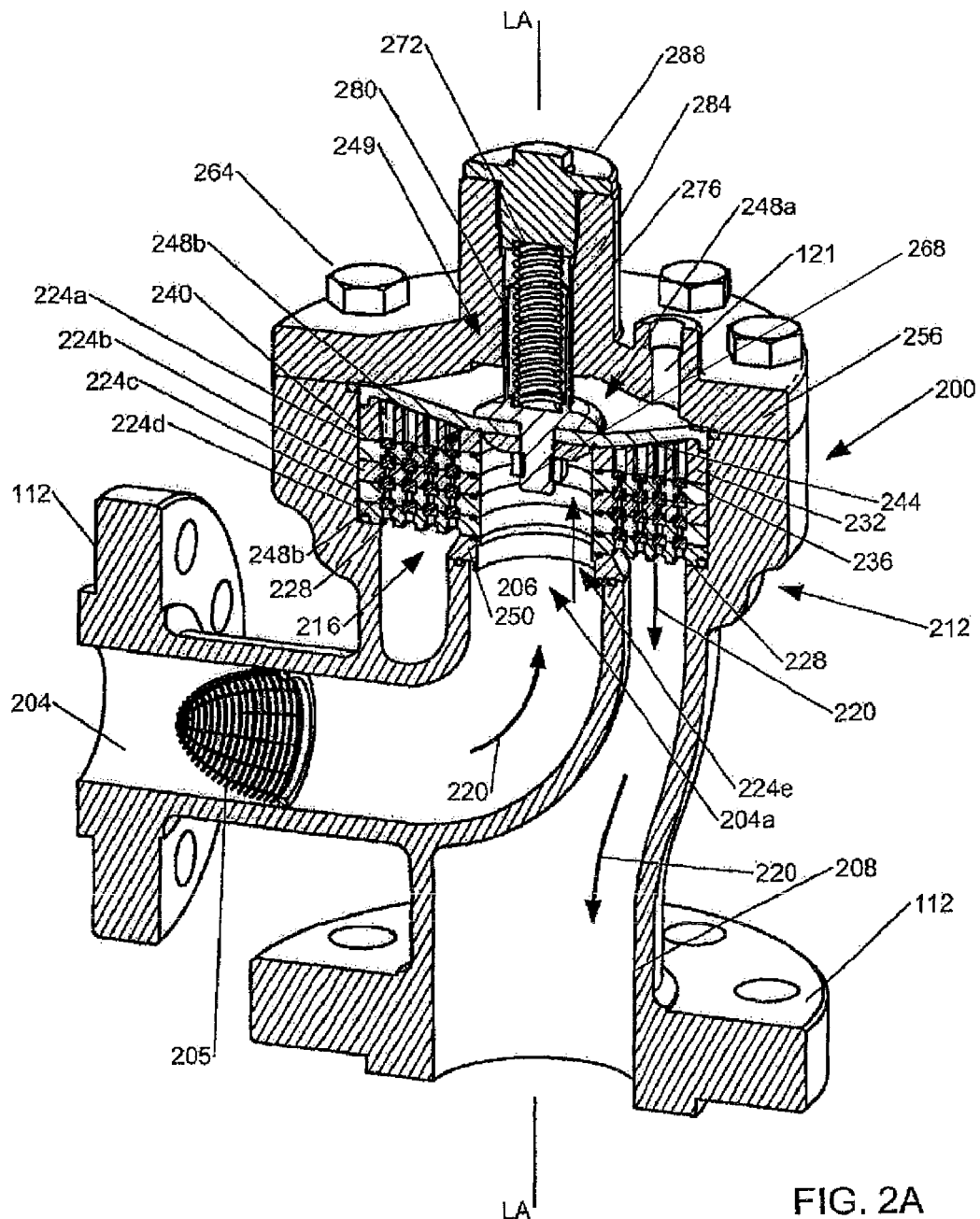
FIG. 2A is a cut-away perspective view of at least one embodiment of the one or more present inventions.

Referring now to FIG. 2A, a cut-away perspective view of the control valve 200 is shown. The control valve 200 depicted in FIG. 2A includes a side inlet 204 and a downwardly oriented outlet 208. Accordingly, it is to be understood that embodiments of the one or more present inventions include a variety of possible configurations, and such configurations are considered to be encompassed by the scope of the embodiments described herein.

Referring still to FIG. 2A, the control valve 200 includes a body 212, the body 212 having an interior chamber 216. Residing within the interior chamber 216 is a fluid passageway 220 that extends from the inlet 204 to the outlet 208. The inlet 204 and the outlet 208 each have a circular, or tubular, cross-section in this embodiment, but it will be understand that cross-sections of different shapes, such as rectangular, elliptical, and the like, fall within the scope of the disclosure. In addition, the size of the interior chamber 216 and outlet 208 may be of the same dimensions, larger, or smaller than the dimensions of the inlet 204, as desired. For example, an outlet 208 that is of larger dimensions and, consequently, a larger flow area, contributes to a desired reduction in the pressure of the fluid within the outlet 208 relative to the upstream pressure in the inlet 204 and a reduction in noise of the fluid flowing through the conduit 208.

Situated within the fluid passageway 220 is at least one and, more preferably, a plurality, of flow control plates 224, wherein the flow control plates 224 are stacked on top of each other. For the embodiment shown in FIG. 2A, four flow control plates 224a-d are shown; however, it is to be understood that more or less than four flow control plates can be utilized such as one, two, three, five, six, and so on.

With further reference to FIG. 2A, in at least one embodiment an outer circumferential portion of the bottom-most flow control plate 224d at least partially rests on top of a supporting shoulder 228 formed in the interior chamber 216 of body 212. Accordingly, in at least one embodiment, the flow control plates 224 have a larger diameter than an adjacent downstream portion of the interior chamber 216 forming a portion of the fluid passageway 220.

Referring still to FIG. 2A, and in accordance with at least one embodiment, the upper-most flow control plate 224a is overlain by a throttle plate 232. The throttle plate 232 includes a bottom surface 236 to be situated over the top surface 240 of the upper-most flow control plate 224a. The throttle plate 232 further includes a sloped upper surface 244. That is, the sloped upper surface 244 of the throttle plate 232 is not parallel to the bottom surface 236 of the throttle plate 232. It will be understood that the throttle plate 232 in other embodiments can have a substantially flat or horizontal upper surface 244. As described in more detail below, the throttle plate 232 and the flow control plates 224 preferably include a plurality of substantially concentrically situated rows of apertures for allowing fluid to flow generally in an axial direction through the flow control plates 224 and throttle plate 232 relative to the orientation of the flow control plates 224 and throttle plate 232.

The control valve 200 further includes a diaphragm 248 for contacting at least a portion of the sloped upper surface 244 of the throttle plate 232. The diaphragm 248 is typically an elastomer, rubber or other elastic materially, such as Viton, EPDM, Hydrin, and the like and can be reinforced with fabric, such as Kevlar, nylons, fiberglass, or other materials to improve the strength and durability of the diaphragm 248. The upper surface 248a of the diaphragm 248 defines the lower portion of a loading chamber 249, which is further defined by the interior of the valve cover 256, and typically prevents any fluidic communication occurring between the loading chamber 249 and the interior chamber 216. The pilot valve assembly 116 is in fluidic communication with the loading chamber 249 via orifice or line 121. Thus, the pressure within the loading chamber 249 is reflective, whether amplified or damped, of the pressure measured by the pilot valve assembly 116, and can be reflective of the pressure differential and/or the flow rate between the upstream conduit 204 and the downstream conduit 208, just the pressure upstream conduit 204, just the pressure of the downstream conduit 208, or other configurations of the pilot valve assembly 116 known in the art. For example, and depending on the configuration of the pilot valve assembly 116 relative to the upstream conduit 204 and the downstream conduit 208, the pilot valve assembly 116 dictates the allowance of relatively more flow through the control valve 200, an increasing portion of the diaphragm 248 rises away from the sloped upper surface 244 of the throttle plate 232. In so doing, fluid is allowed to flow an increased radial distance away from the center of the diaphragm 248, wherein it exits through openings in the throttle plate 232 to pass through fluid apertures in the underlying flow plates 224.

Figure 2B:
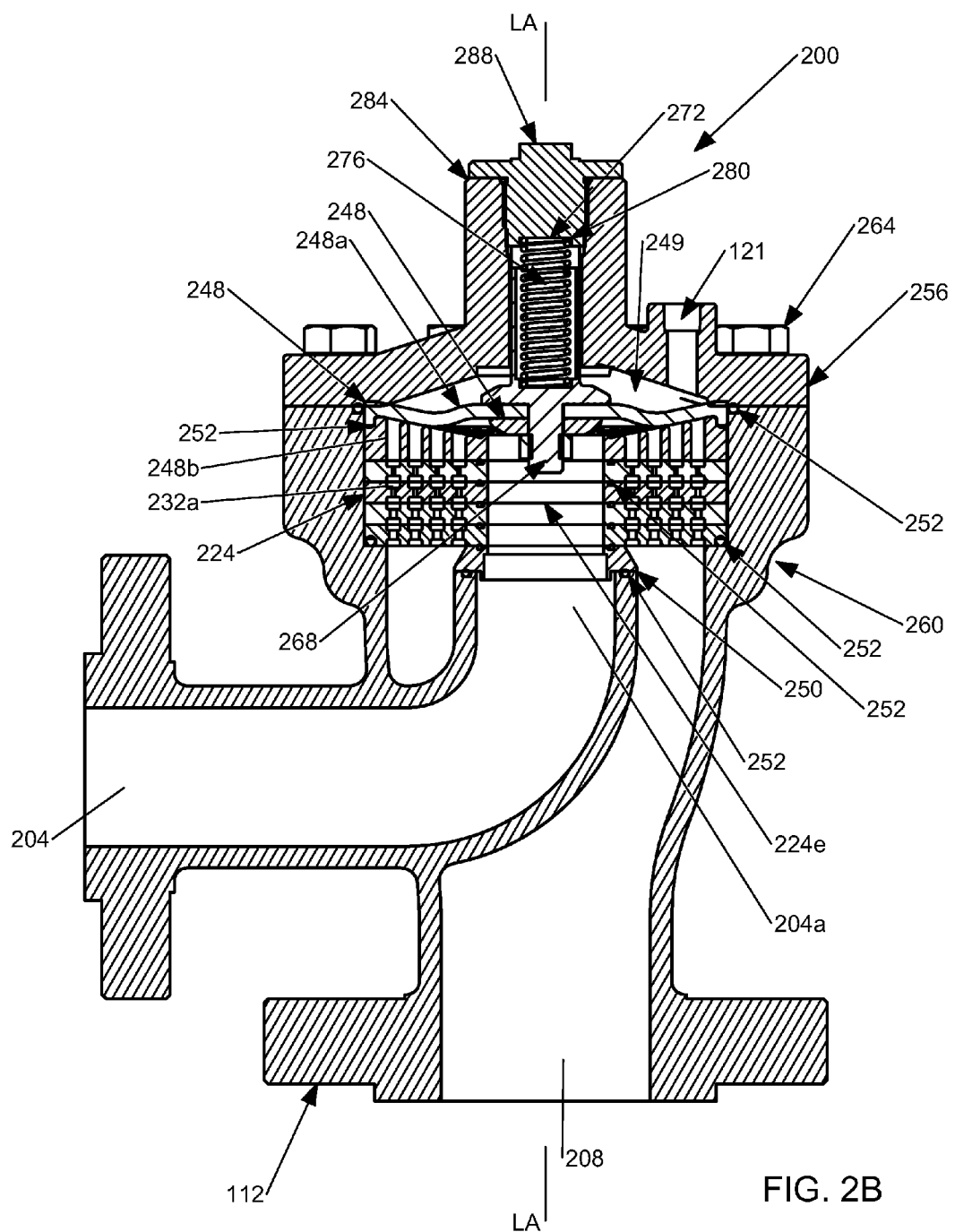
FIG. 2B is a cross-sectional view of the device shown in FIG. 2A.
Figure 2C:
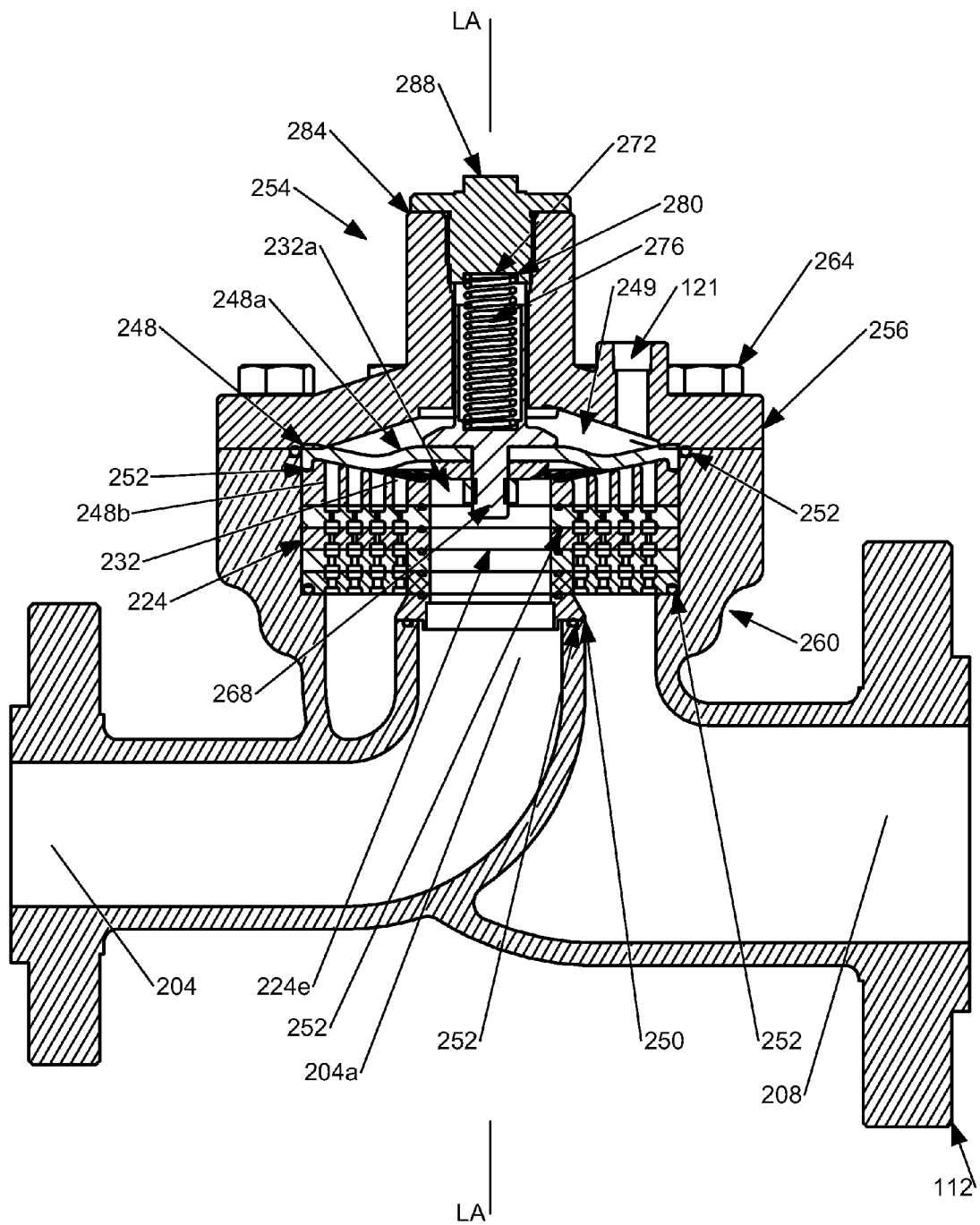
FIG. 2C is a cross-sectional view of a similar flow control valve, the flow control valve having an alternate outlet configuration, such as the inlet and outlet configuration shown in FIG. 1.

With reference now to FIGS. 2B and 2C, two cross-sections of embodiments of the flow control valve are illustrated. FIG. 2B shows the valve of FIG. 2A with a vertically oriented outlet (as per the orientation of the drawing on the page), and FIG. 2C shows a valve having a horizontally oriented outlet (as per the orientation of the drawing on the page). Although the orientations of the outlets differ, the elements of the valves shown in FIGS. 2B and 2C are the same.

In accordance with at least one embodiment, the control valve 200 includes a number of o-rings 252, including an o-ring 252 located between the valve cover 256 and the valve base 260 of the valve body 212, wherein fasteners 264, such as bolts, may be used to secure the valve cover 256 to the valve base 260. In other embodiments, the valve cover 256 can be welded or otherwise secured to the valve base 260. In addition, o-rings 252 are located between the flow control plates 224, between the throttle plate 232 and the diaphragm 248, and between a lower support ring 250 and its adjacent inlet wall 206 (shown in FIG. 2A). FIGS. 2B and 2C further illustrate the plug 268 and its interconnection to the diaphragm 248. The plug 268 travels along the longitudinal axis LA-LA of the control valve 200, and deflects a biasing member, such as a coil spring 272, when the diaphragm 248 raises and separates from the throttle plate 232. The spring 272 resides within a spring piston 276 that travels within a spring cylinder 280. The spring 272 is contained within the spring casing 284 by a valve cap 288.

Vertical movement of the diaphragm 248, that is, displacement of the diaphragm 248 axially (i.e., in a direction parallel to the longitudinal axis LA-LA of the control valve 200) is governed by the pressure differential in the loading chamber 249 and the pressure in the upstream conduit 204, resulting, in part, from the fluid demand put on the downstream system, such as a downstream pipeline, where demand on the downstream system drops the pressure in the downstream conduit. In operation for this configuration, the pilot valve assembly 116 is adjusted to establish the desired fluid pressure in the downstream system based on the normal demand of the downstream system connected to the outlet conduit 108. As discussed, the configuration of the pilot valve assembly 116 can be changed to allow the control valve 200 to control and/or monitor different fluid parameters in the upstream conduit 204 and the downstream conduit 208. Fluid thus flows from the inlet conduit 104, through the flow control valve 200 and to the outlet conduit 108, and therefore to the downstream system to supply the requisite amount of fluid to the system.

If the fluid demand of the system is increased, the pressure in the downstream system, such as a pipeline, and, in turn, the pressure in the outlet conduit 108 will be reduced an amount reflective of the increased demand. The reduced fluid pressure in the downstream system is communicated to the pilot valve assembly 116 via a sensing line 117 (illustrated in FIG. 1). The pilot valve assembly 116 in turn operates to transmit a fluid under pressure, typically amplified, reflective of the reduced pressure to the loading chamber 249 and, consequently, to the upper side 248a of the diaphragm 248 via line 119 (illustrated in FIG. 1) and orifice 121 (illustrated in FIGS. 2A-2C). The pressure in force per unit area, such as pounds force per square inch (psi), on the interior chamber 216 on the bottom surface or lower side 248b of the diaphragm 248 will be at the supply pressure of the fluid. As a result of reduced pressure in the outlet conduit 108 due to increased demand, the pilot valve assembly 116 transmits a pressure reflective of the downstream pressure on the loading chamber 249 and upper side 248a is reduced. The total force on the interior chamber 216 or inlet side 248b of the diaphragm 248 is such that the diaphragm 248 is forced away from the throttle plate 232 (upward relative to the orientation shown in FIG. 2A) by the pressure difference across the diaphragm 248. More particularly, the higher pressure on the inlet side 248b separates or "peels" the diaphragm 248 from the upper sloped surface 244 of the throttle plate 232.

As the pilot valve assembly 116 operates in response to a decrease in pressure in the downstream system, a pressure differential ($\Delta P$) that is created between or across the supper side 248a and lower side 248b surfaces of the diaphragm 248 results in an upstream force $F_{Up}$ opposing the spring force $F_{Spring}$ exerted by the biasing member, like coil spring 272, and the pressure in the loading chamber 249 of the fluid on the upper side 248a, or $F_{Loading}$. A force balance situation therefore results when the outlet pressure is at a value selected by and controlled by the pilot valve assembly 116 and the coil spring 272 and other factors, such as the modulus of elasticity of the diaphragm, and the like. The coil spring 272 and the pressure of the fluid between the pilot valve assembly 116 and the orifice 121, in part, control the position of the diaphragm 248 with respect to the throttle plate 232, that, in turn, controls the amount of open area available for fluid to flow through the throttle plate 232 and downstream. Therefore, when the upstream force $F_{Up}$ exceeds the spring force sum of the $F_{Spring}$ applied by the biasing member, like coil spring 272, and the pressure $F_{Loading}$ in the loading chamber 249, that is, when $F_{Up} > F_{Spring} + F_{Loading}$, the diaphragm 248 lifts from the throttling plate 232 to a first, open position allowing flow to pass through the control valve 200 until the upstream force $F_{Up}$ no longer exceeds the spring force $F_{Spring} + F_{Loading}$. Thus, the separation of at least a portion of the lower side 248b of the diaphragm 248 from the throttle plate 232 allows fluid to flow over the upper sloped surface 244 of the throttle plate 232 and under the diaphragm 248 until the fluid passes through apertures within the throttle plate 232 and then through the flow control plates 224 and out the downstream outlet 208. In general, the diaphragm 248 acts with the throttle plate 232 to permit additional fluid from the upstream system to flow through additional, concentrically located rows of apertures in the throttle plate 232 when sufficient pressure differential occurs across the diaphragm 248, thereby increasing the flow through the control valve 200. When the resulting increase in fluid flow into the downstream system satisfies the increase in the downstream system demand, a new balanced condition is achieved. This type of operation continues for all fluctuations in the system demand. Of course, if the pilot valve assembly 116 is adjusted, the pressure in the outlet conduit 108 and the downstream system will change automatically and attain another steady state condition.

Figure 3:
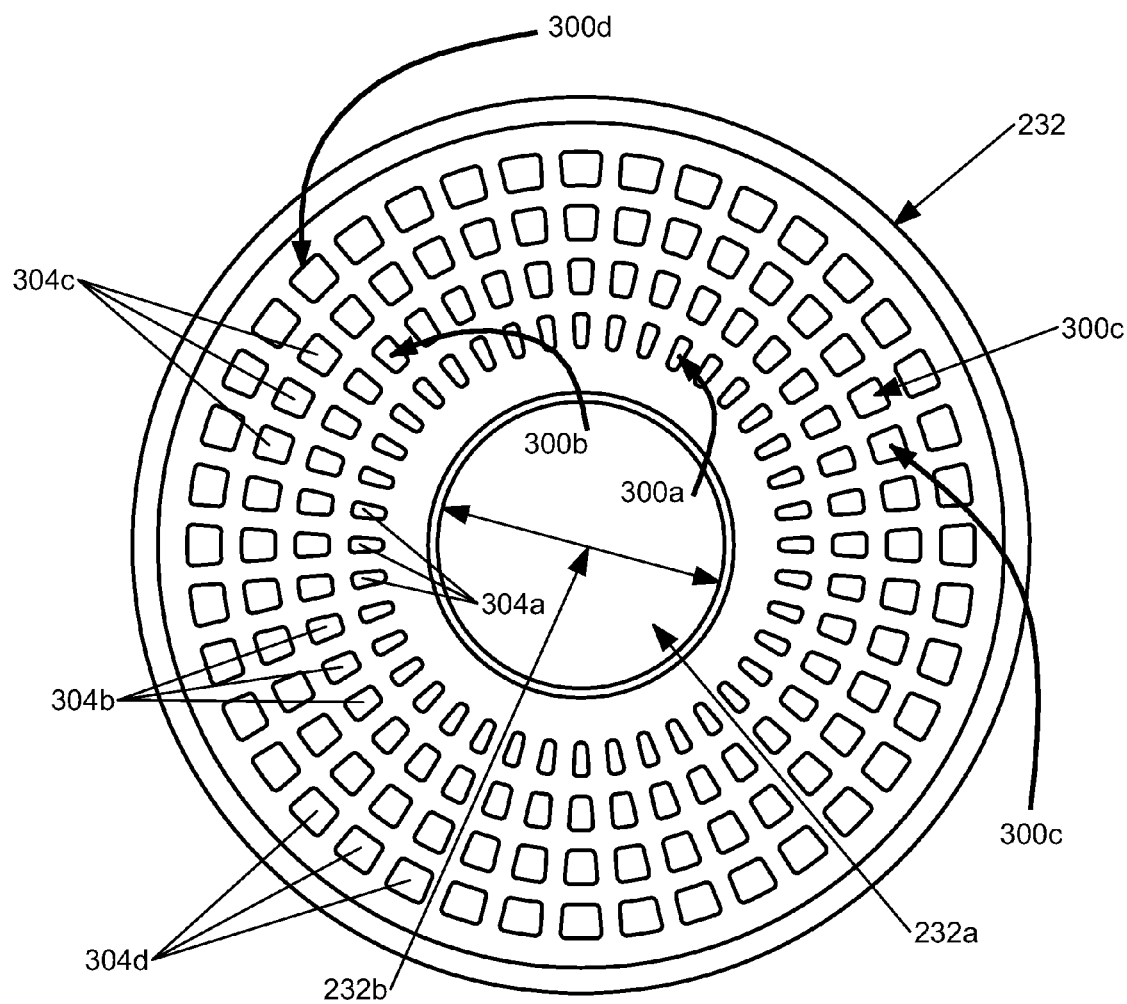
FIG. 3 is a top plan view of a throttle plate of the flow control valve shown in FIG. 2A.

Referring now to FIG. 3, and in accordance with at least one embodiment, a top plan view of a throttle plate 232 is shown. The exemplary throttle plate 232 shown in FIG. 3 includes a plurality of concentrically situated rows of apertures. More particularly, an innermost radial row 300a of apertures 304a is illustrated, along with three additional concentric rows 300b-d. In at least one illustrated embodiment, the apertures 304a of the innermost row 300a are relatively small in plan surface area relative to the apertures 304b-d that are situated at increasing radial distances from the center of the throttle plate 232. Advantageously, as the demand increases on the downstream system, and thus the pressure differential across the diaphragm 248 increases, the surface area of the apertures 304a through 304d increases with radial distance from the center of the throttle plate 232 to accommodate the increased demand and to provide more fluid flow through the control valve 200 as may be required. The throttle plate 232 notably has a center aperture 232a of diameter 232b, which is here shown as a circular (in projection) hole that registers with the center holes 224e of diameter 224f (illustrated in FIG. 5) of the flow control plates 224 with the cylindrical, proximal portion of 204a of the inlet 204. While the center apertures 232b and 224e of the throttle plate 232 and flow control plates 224, respectively, are here shown to be essentially concentric to form a cylindrical like tube directing fluid upwardly toward the diaphragm 248, the portion 204a of the inlet 204 may extend upwardly toward the diaphragm 248 with the center apertures 232a and 224e of the throttle plate 232 and the flow control plates 224, respectively, sized to fit snuggly over the inlet portion 204a.

Figure 4A:
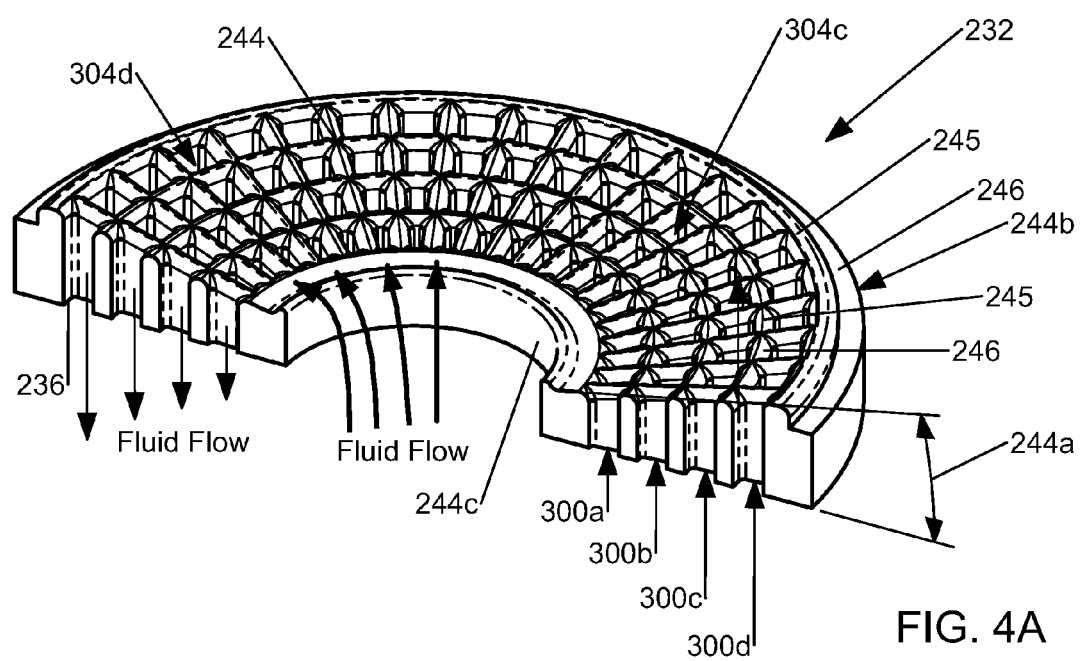
FIG. 4A is a partial perspective view of the throttle plate shown in FIG. 3.
Figure 4B:
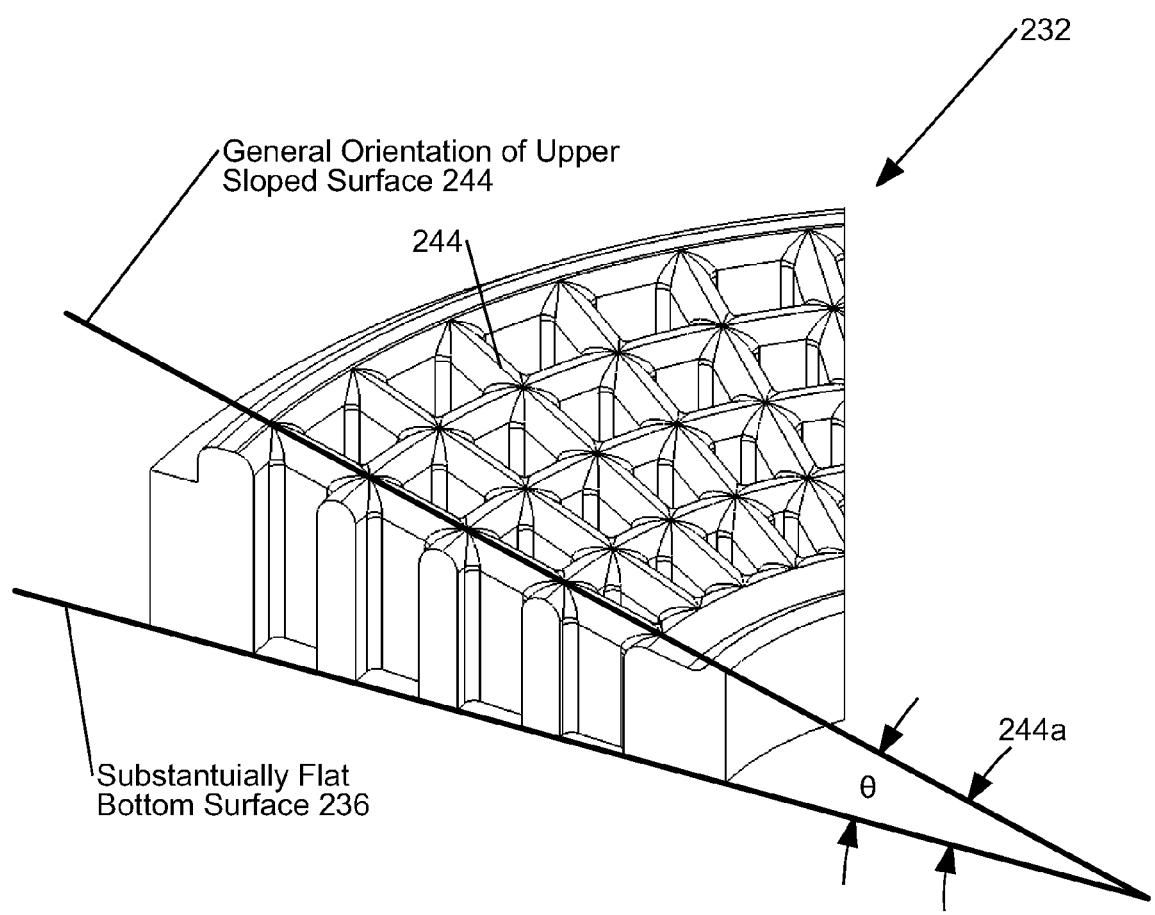
FIG. 4B is an enlarged portion of the throttle plate shown in FIG. 4A.

Referring now to FIG. 4A, a partial cut-away perspective view of the throttle plate 232 shown in FIG. 3 is illustrated. As seen in FIG. 4A, the upper sloped surface 244 optionally rises upward at an angle 244a toward the exterior 244b when moving from the interior 244c radially outward. (Other embodiments of the throttle plate 232 do not employ a sloped upper surface 244.) The angle 244a of the upper sloped surface 244 relative to the bottom surface 236 may be selected depending in part upon the desired speed with which the system needs to be brought back into balance and pressure fluctuations in the inlet 204, and further depending upon the size of the apertures 304a-d as the radial distance increases. (Of course, one with skill in the art will understand that the speed with which the system regains balance is a function of the volume of the loading chamber 249, the size of the orifice 121, the properties of the pilot valve assembly 116, and other factors.) With reference now to FIG. 4B, the general orientation of the upper sloped surface 244 relative to the substantially flat bottom surface 236 may be situated at an angle θ or 244a of between about 0 to 45 degrees and, typically includes smaller ranges, such as between about 5 to 30 degrees, about 7 to 20 degrees, and, between about 10 to 15 degrees, among other possible ranges. Notably the size of the individual apertures 304a-d in each row 300a-d increase in cross-sectional area so that the mass flow rate through the throttle plate 232 increases not in a linear but rather exponentially as the diaphragm 248 rises off the throttle plate 232. The cross-sectional area of the individual apertures 304a-d or selected apertures (for example, every other aperture) can be changed or modified to change or vary the response characteristics of a throttle plate 232 and, in turn, the control valve 200. The throttle plate 232 also optionally includes a narrower ridge 245 to separate each of the rows 300a-300d, which helps to improve the seal between the diaphragm 248 and the throttle plate 232. A shoulder 246 adjacent on one or both sides of the ridge 245 provides a surface for the diaphragm 248 to rest upon when it is in contact with the ridge 245.

Figure 5:
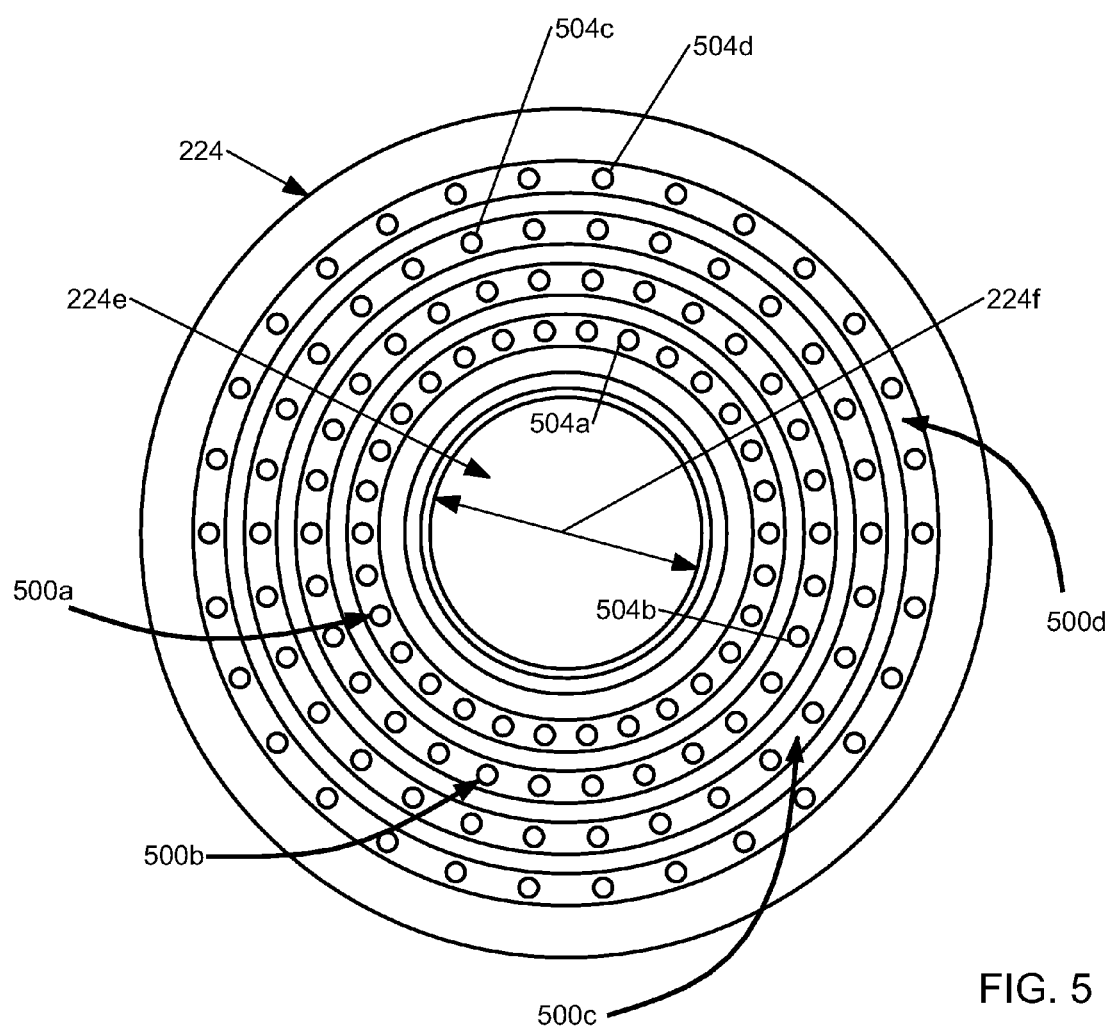
FIG. 5 is a top plan view of a flow control plate of the flow control valve shown in FIG. 2A.
Figure 6:
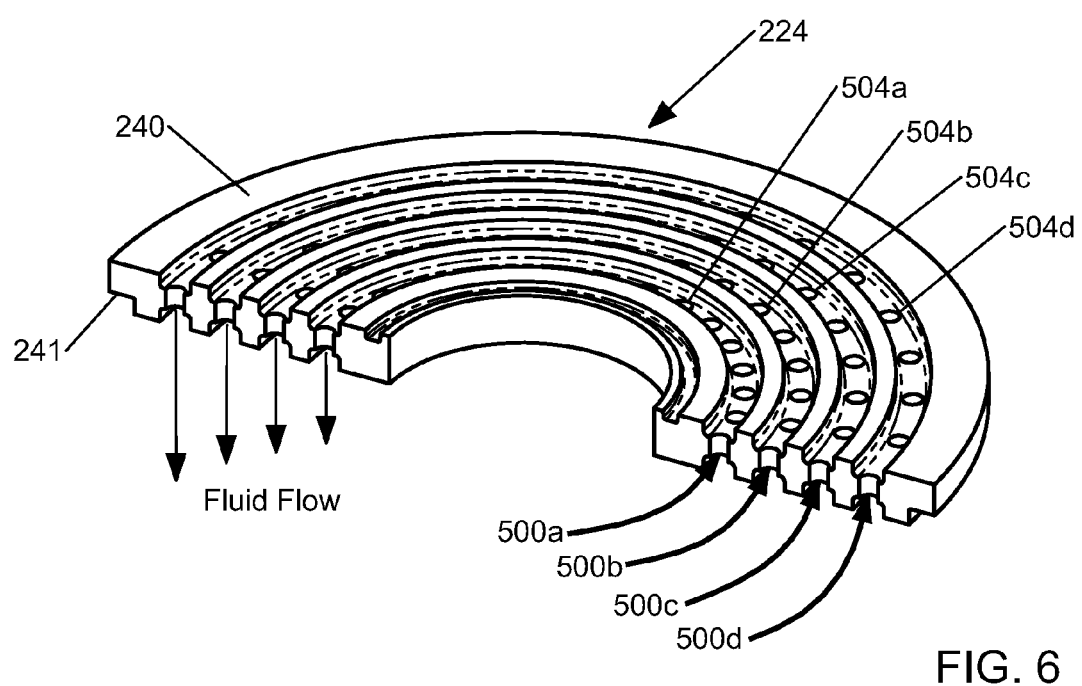
FIG. 6 is a partial perspective view of the flow control plate shown in FIG. 5.

Referring now to FIGS. 5 and 6, and in accordance with at least one embodiment, an example of a flow control plate 224 is shown. For the exemplary embodiment shown in FIGS. 5 and 6, the flow control plate 224 has four substantially concentric single rows 500a-d of apertures 504a-d. In addition, for the embodiment shown, the apertures 504a-d are substantially circular shaped in plan view and are substantially equal size in diameter within a given row, such as row 500a, and are also substantially equal size in diameter amongst the various rows 500a-d. However, it is to be understood that a variety of sizes and shapes of apertures may be used. While the cross-sectional area of each of the apertures 504a-d is shown to be essentially the same, they cross-sectional area and even the shape of the apertures 504a-d can be varied to control or vary the response characteristics of the flow control plate 224 and, in turn, the control valve 200 itself. The apertures 504a-d may vary in shape (e.g., rectangular, elliptical, and/or circular) and may also vary in cross-section from row to row and circumferentially in a row.

Figure 7:
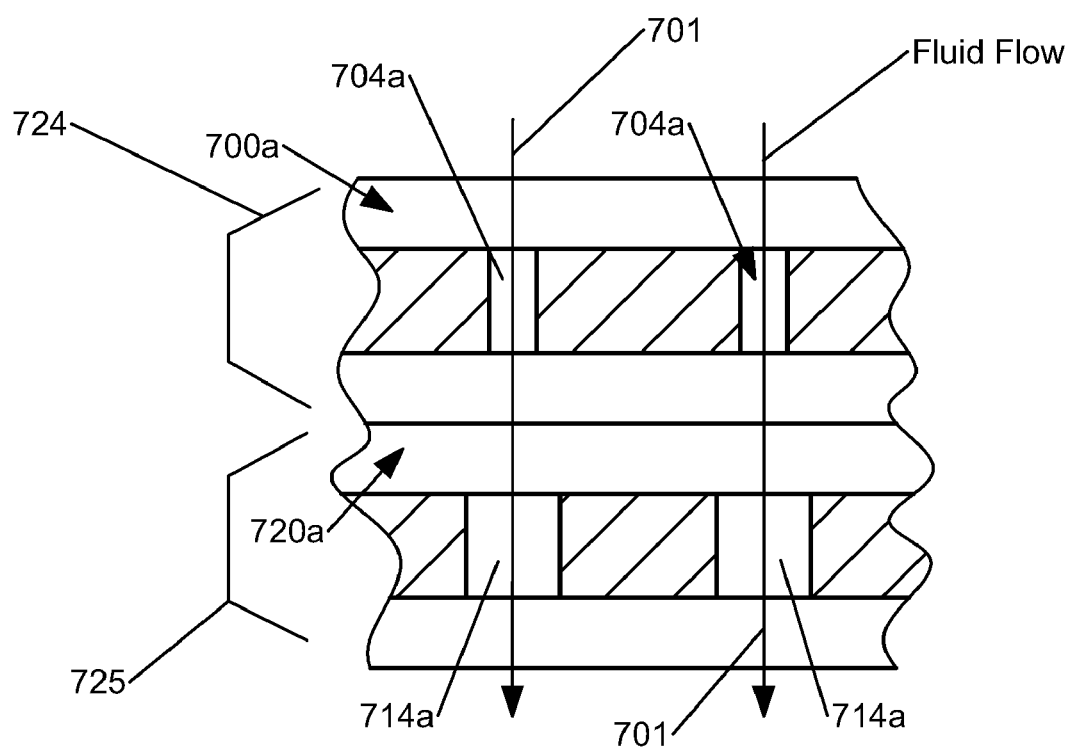
FIG. 7 is a cross-sectional view of a portion of two flow control plates in accordance with at least one embodiment.

Illustrated in FIG. 7 is an embodiment of the flow control plate 224 shown in FIGS. 1-2C. Where a plurality of flow control plates 224 are stacked on top of each other, the orientation of the flow control plates 224 may be adjusted to form different flow paths for the fluid, which, in turn, will influence the rate at which the fluid flows through the control valve 200. More particularly, and with reference to FIG. 7, a cross-sectional view of small portions of two flow control plates 724 (corresponding to 224a, for example) and 725 (corresponding to 224b, for example) are shown stacked vertically over one another, where the upper flow control plate 724 has apertures 704a (corresponding to apertures 504a in row 500a of flow control plate 224 illustrated in FIGS. 5 and 6) aligned with the apertures 714a (similarly corresponding to apertures 504a in row 500a of flow control plate 224 illustrated in FIGS. 5 and 6) of the lower flow control plate 725. Thus, for FIG. 7, the view is taken circumferentially along a small portion of the row 700a (corresponding to row 500a of flow control plate 224 illustrated in FIG. 5) of flow control plate 724 and row 720a (similarly corresponding to row 500a of flow control plate 224 illustrated in FIG. 5) of flow control plate 725. Each of the apertures 704a in the upper flow control plate 724 and the aperture 714a of the lower flow control plate 725 are substantially aligned along axis 701, which is the direction that the fluid flows. FIG. 7 further shows that the apertures 704a and 714a may be different in size. More particularly, as shown in FIG. 7, the apertures 704a of flow control plate 724 are smaller in diameter and in cross-section than the apertures 714a of flow control plate 725. In this embodiment, the velocity of the flow passing through aperture 704a typically decreases, particularly for incompressible fluids, as it passes through aperture 714a with the larger cross-section and diameter. In turn, the apertures 704a act to restrict or regulate the flow of the fluid through the plates 724 and 725.

An advantage of this configuration is that as the flow area increases from flow control plate 724 through flow control plate 725 the pressure decreases. In other words, flow control plate 724 may be considered to be a relatively high pressure side and flow control plate 725 a relatively low pressure side when compared to each other. Additional flow control plates can be configured and added downstream of flow control plate 725 to further reduce the pressure and velocity of the fluid flow. The reduction in pressure and velocity typically mitigates noise, and combining two or more flow control plates together reduces the pressure in multiple, smaller steps, creating a multi-stage flow control valve 200 that mitigates noise. In addition, the materials from which the flow control plates are manufactured can be selected, in part, on the propensity or lack thereof to create or mitigate noise as a fluid flows through the flow control plates.

Figure 8:
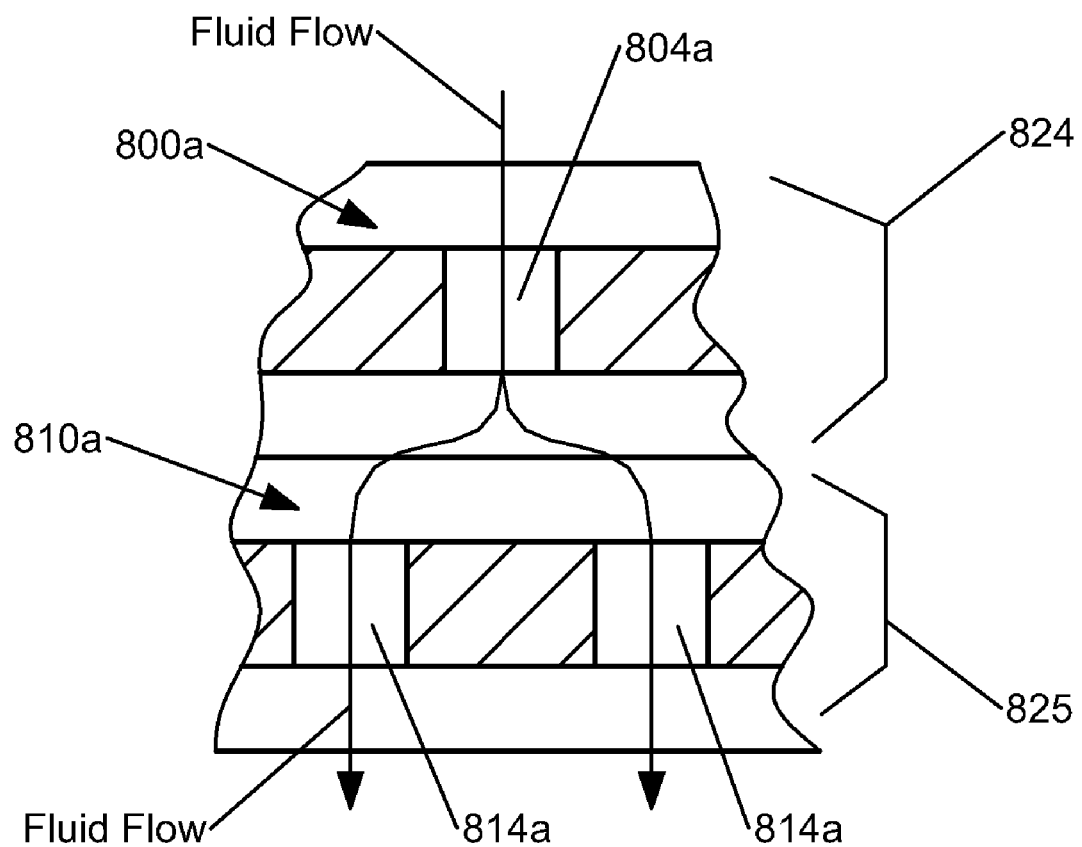
FIG. 8 is a cross-sectional view of a portion of two flow control plates in accordance with at least one embodiment.

With reference now to FIG. 8, again portions of two flow control plates 824 (corresponding to 224a, for example) and 825 (corresponding to 224b, for example) are shown stacked vertically over one another. The upper flow control plate 824 is formed, positioned, and/or rotated relative to the lower flow control plate 825 so the apertures 804a (corresponding to apertures 504a in row 500a of flow control plate 224 illustrated in FIGS. 5 and 6) are not axially aligned with apertures 814a (similarly corresponding to apertures 504a in row 500a of flow control plate 224 illustrated in FIGS. 5 and 6) of the lower flow control plate 825. As in FIG. 7, for FIG. 8 the view is again taken along a small portion of the channel 800a and 820a (each corresponding to row 500a of flow control plate 224 illustrated in FIG. 5). Thus such a configuration forces the fluid to take a longer flow path as the fluid traverses from row 800a to aperture 804a through row 820a to apertures 814a and, as the number of apertures 814a increase in the downstream flow control plate 825, the pressure and, typically, the velocity decrease as described above. The cross-sectional size of the channels 800a and 820a can be selected to control the pressure drop, the noise mitigation, and the response rate of the control valve 200, among other factors. Indeed, one may have an inventory of flow control plates 224 with different rows (or channels) and apertures to affect the flow rate, noise mitigation, and response time of a control valve 200 for any given application and for different fluids.

Figure 9:
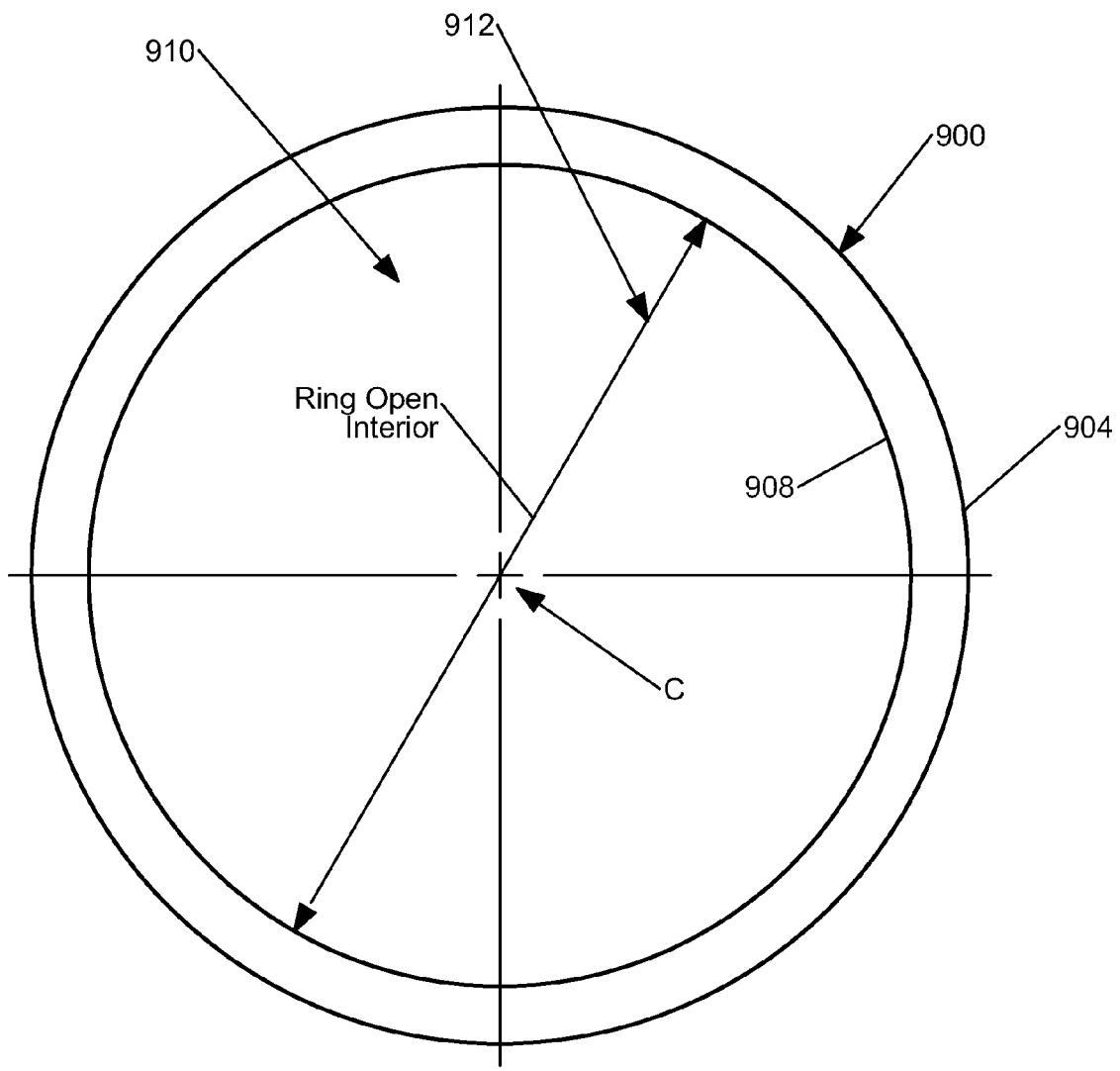
FIG. 9 is a top plan view of a ring that may be used as a spacer instead of a flow control plate.

In at least one embodiment of the invention and referring back to FIGS. 2A-2C, the body 212 and the interior chamber 216 are sized to receive a plurality of flow control plates 224, such as the plurality of flow control plates 224a-d. In addition, in at least one embodiment, and as best seen in FIG. 9, at least one of the flow control plates 224 is used with a ring 900 for serving as a spacer between flow control plates 224, within the control valve 200. Instead of positioning the ring between flow control plates 224, one or more rings 900 may substitute for any one or more flow control plates 224a-d. In addition, the ring 900 is positionable between the throttle plate 232 and the uppermost flow control plate 224a, as well as between the bottom-most flow control plate and the supporting shoulder 228 of the body 212. In accordance with such an embodiment, the ring 900 may be devoid of interior concentric rows of apertures. That is, as seen in FIG. 9, the ring 900 comprises an outer circumferential surface 904 and an inner circumferential surface 908, wherein such surfaces substantially correspond to an interior wall of the interior chamber 216 and an inner edge alignment with the shoulder 228, respectively, when the ring 900 is installed within the interior chamber 216 of the flow control valve 200. The ring 900 preferably has a center aperture 910 with a diameter 912 that is typically equal to or greater than the diameter of each diameter 224f of the center aperture 224e of the flow control plate 224 and the diameter 232b of the center aperture 232a of the throttle control plate 232 respectively. Thus, when axially aligned, the flow control plates 224 and ring 900 share a common axis when installed in the interior chamber 216 of the valve body 212 and registers with the proximal portion 204a of the inlet 204. In an alternate embodiment, a ring 900 may include a single concentric row of apertures, such as the radially outermost row of apertures, such as row 500d and apertures 504d illustrated in FIG. 5, for example. In yet another alternative, a ring may include a lesser number of concentric rows of apertures, such as rows 500c-d and apertures 504c-d illustrated in FIG. 5, for example, than one or more other flow control plates 224 used within the control valve 200. By way of example and not limitation, an interior chamber of a given control valve 200 may be sized to receive ten vertically stacked flow control plates 224. The initial assembly of the control valve 200 may include at least one ring 900, wherein the ring 900 does not include a plurality of rows of apertures. The ring 900 could be changed at a later time with a standard flow control plate 224. Such a configuration allows control valves 200 of the one or more present inventions to be field modified to accommodate varying flow conditions over the life of the control valve 200, such that the control valve 200 can be serviced to modify its flow characteristics, wherein such modifications can provide cost savings over removing and replacing the valve. In addition, the embodiments described herein provide the capability to add additional flow control plates 224 for adjusting the pressure while also mitigating noise generation as fluid passes through the flow control valve.

Figure 10:
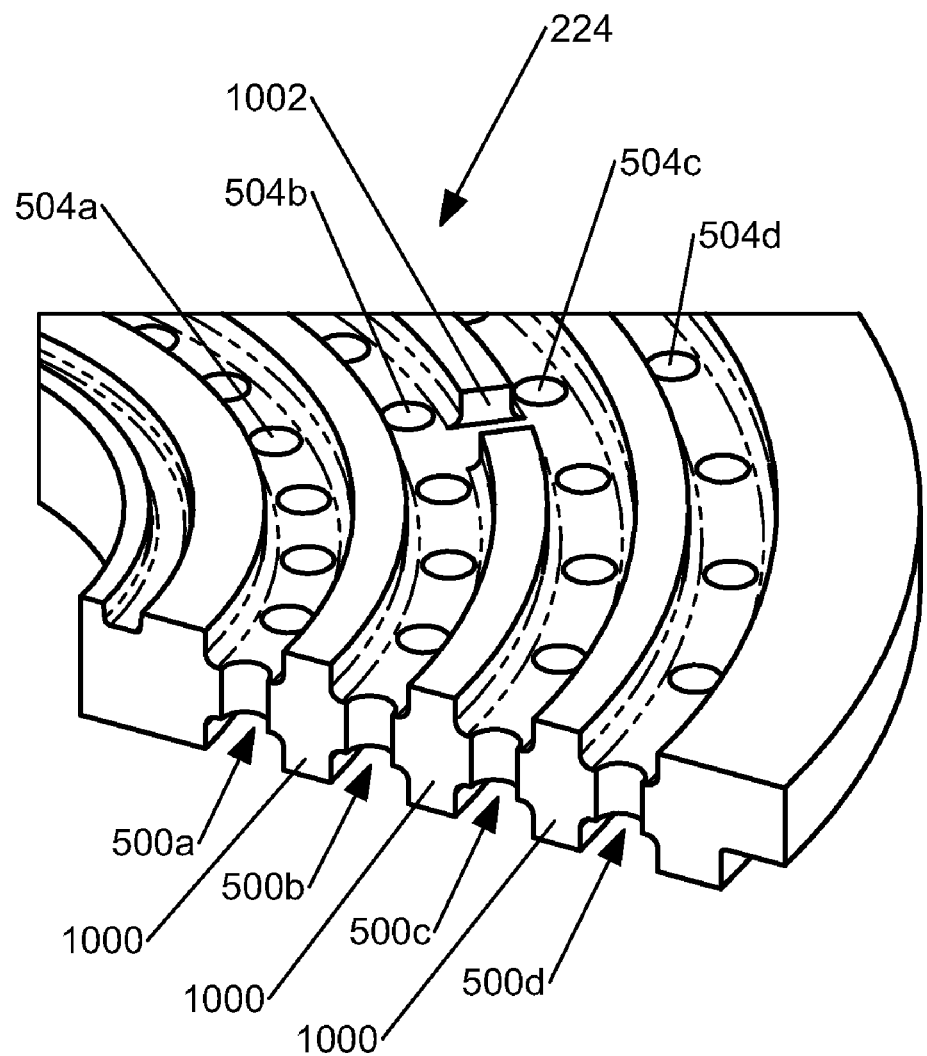
FIG. 10 is an enlarged portion of the flow control plate shown in FIG. 6.

Referring now to FIG. 10, an enlarged detail drawing of a portion of a flow control plate 224 of FIG. 6 is shown. As described above, the flow control plate 224 includes a plurality of concentric rows such as four concentric single rows 500a-d containing apertures 504a-504d, spaced circumferentially. While shown to be spaced equidistantly, it is within contemplation that the apertures can be in any spacing or pattern of spacing desired to effect the desired control response rate. Further, as those skilled in the art will appreciate, fewer or more than four rows 500a-d of apertures 504a-d may be used in any given flow control plate 224. The flow control plate 224 optionally includes the shoulder 240 proximate the maximum radial distance from the center of the center hole 224e, and optionally includes a ledge 241 configured to rest upon the shoulder 228 of the interior chamber 216.

Figure 11:
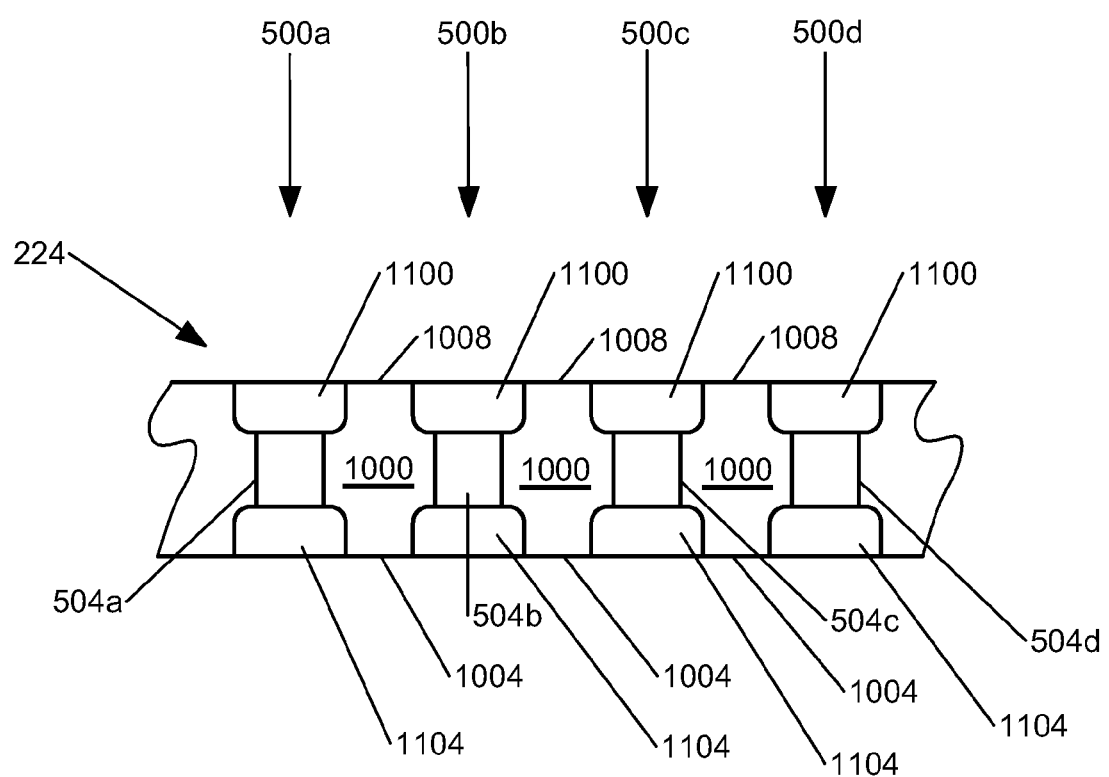
FIG. 11 is a cut-away detail side elevation view of a portion of the flow control plate shown in FIG. 10.

As best seen in FIG. 11, the individual rows, for example, row 500a, generally include an upper recessed portion 1100 and a lower recessed portion 1104. The upper recessed portion 1100 acts as a channel for conveying fluid to adjacent apertures, such as apertures 504a within row 500a. Optionally and alternatively, the flow control plate 224 may include a cross-channel 1002, illustrated in FIG. 10 with dashed lines, that permits fluid to flow from one row to another row, in this example row 500b and 500c. Such a cross-channel 1002 permits another method to modify the rate at which fluid flows through the flow control plate 224.

Figure 12:
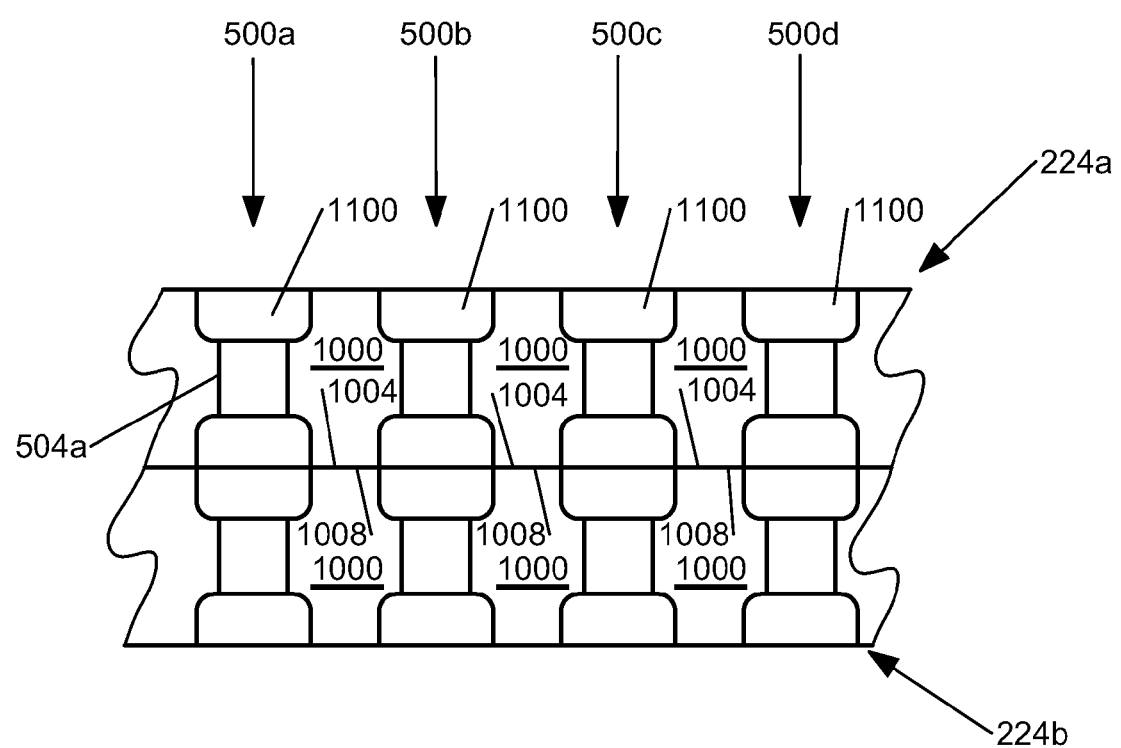
FIG. 12 is a cut-away detail side elevation view of two stacked flow control plates.

Referring now to FIGS. 10-12, situated between the concentric rows 500a-500d are row dividers 1000. When the flow control plates 224 are stacked on top of each other, such as the configuration shown in FIG. 12, the bottom 1004 of a row divider 1000 of a first flow control plate 224, such as flow control plate 224a, contacts a top 1008 of a row divider 1000 of an underlying or second flow control plate 224b. This arrangement of concentric rows 500a-d of apertures 504a-d divided by the row dividers 1000 results in a stepped function for the control valve 200 because the diaphragm 248 must rise over the next radially outward row of apertures 304a-d of throttle plate 232 before the fluid can pass through the next outer concentric row of apertures within the flow control plates 224.

Figure 13:
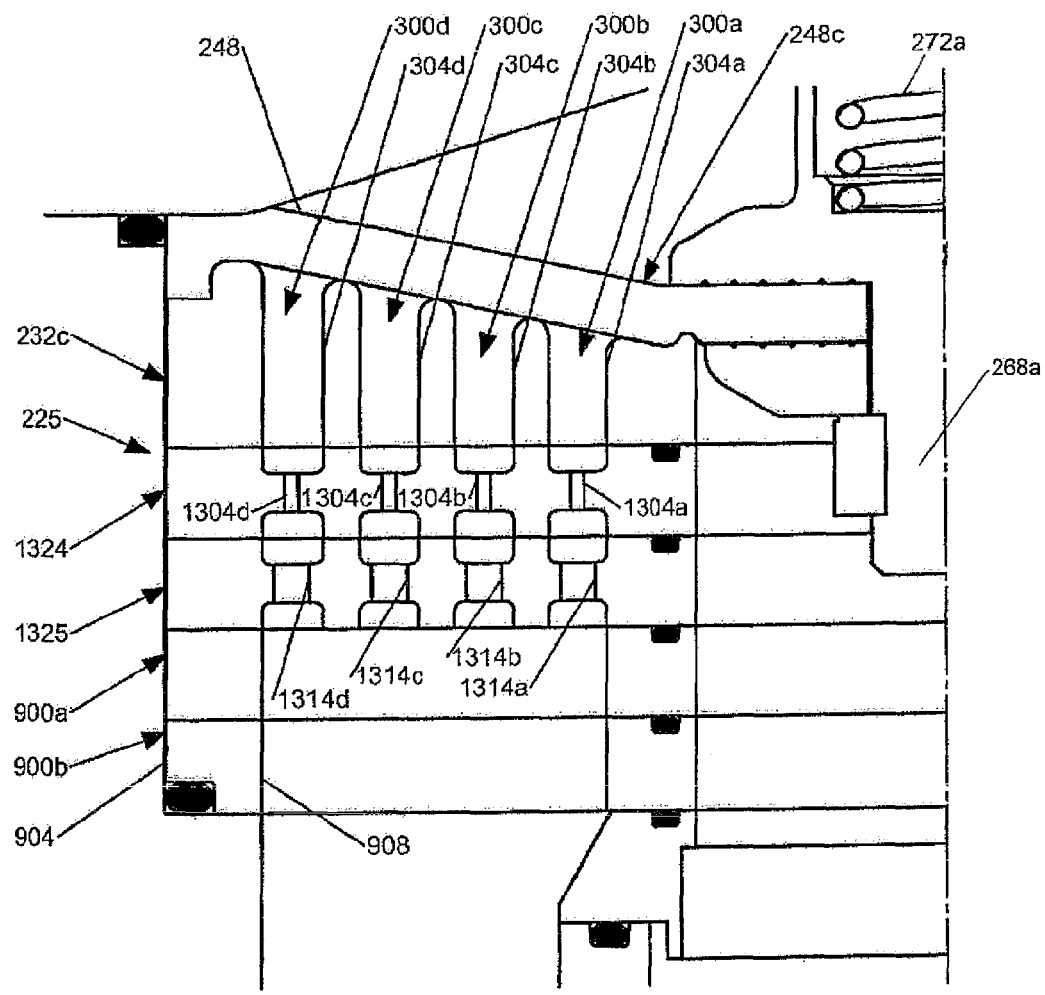
FIG. 13 is a cut-away side elevation view of a portion of the throttle plate and the flow control plates and related structures in accordance with at least one embodiment, wherein the diaphragm is in a closed position.
Figure 14:
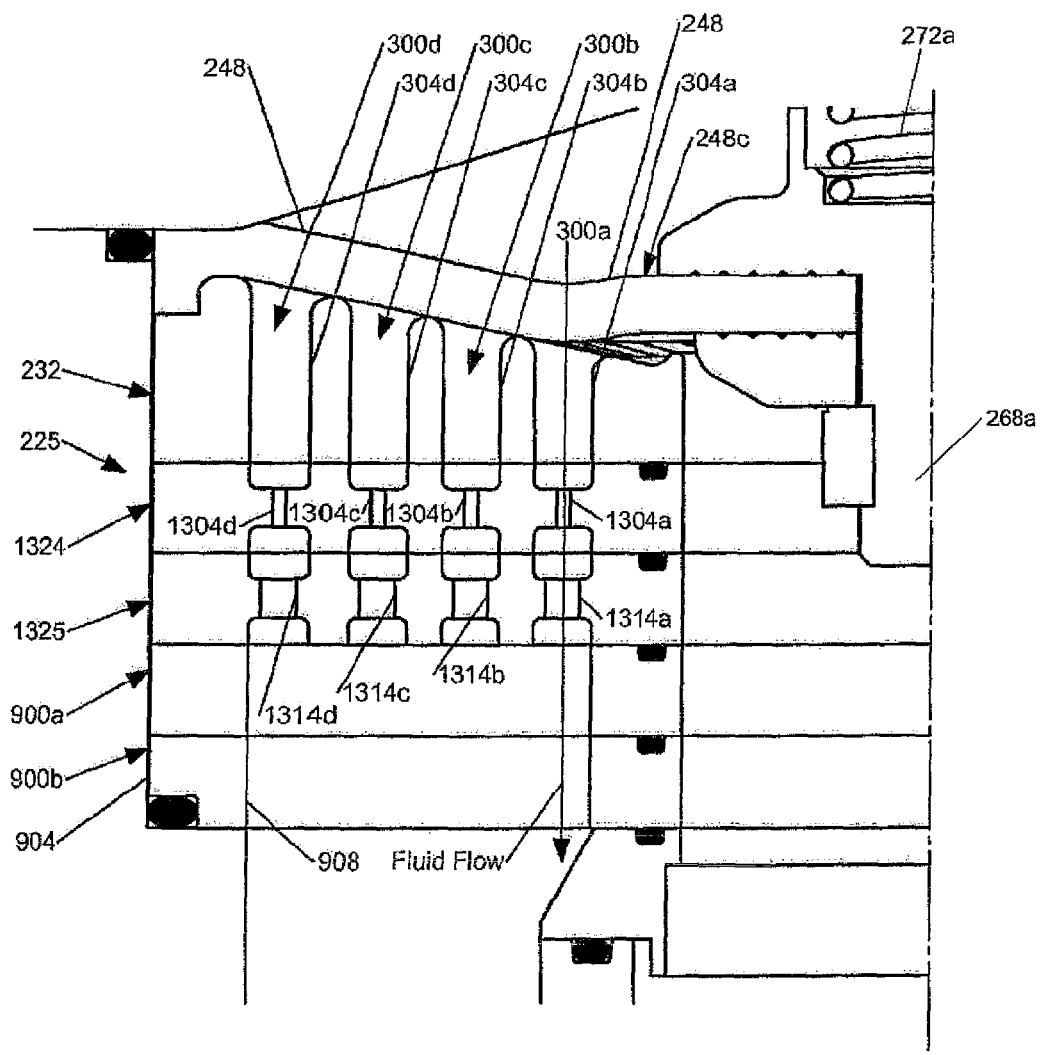
FIG. 14 is a cut-away side elevation view of a portion of the throttle plate and the flow control plates and related structures in accordance with at least one embodiment, wherein the diaphragm is in a partially raised position.
Figure 15:
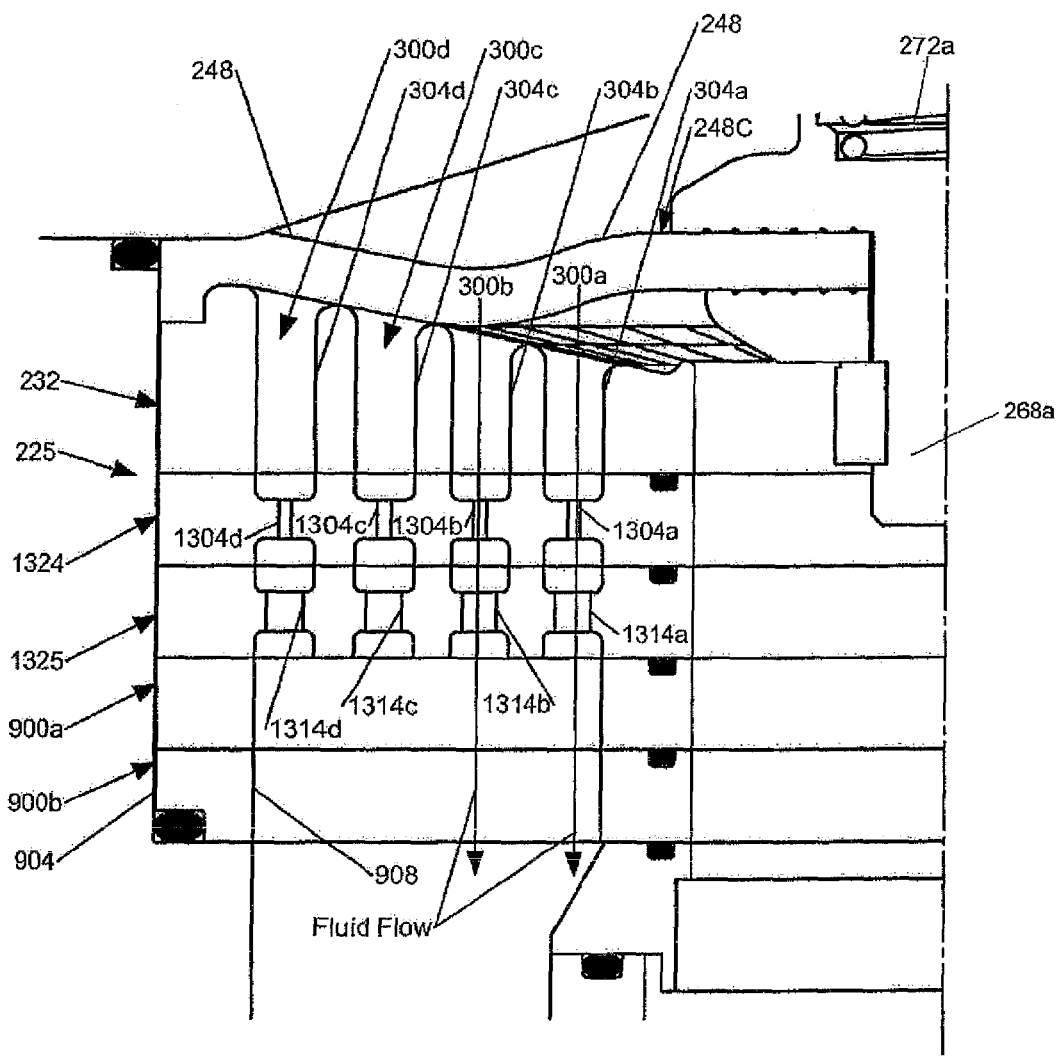
FIG. 15 is a cut-away side elevation view of a portion of the throttle plate and the flow control plates and related structures in accordance with at least one embodiment, wherein the diaphragm is in a further raised position.

FIGS. 13-15 illustrate a cross-section of an embodiment of a stack of plates 225 that includes a throttle plate 232 of FIG. 3, two flow control plates 1324 and 1325 (each corresponding to flow control plate 224 of FIG. 5), and two rings 900 illustrated in FIG. 9. FIGS. 13-15 are a series of three drawings that illustrate three of the numerous possible positions for the diaphragm 248, and thus, for fluid flow through the throttle plate 232 and flow plates 1324 and 1325. FIG. 13 illustrates the state where the diaphragm 248 is located over all of the concentric rows 300a-d of apertures 304a-d that reside within an example throttle plate 232. In other words, the diaphragm 248 is in a first, or closed position. Accordingly, for FIG. 13, no fluid flow is occurring through the various plates. Should demand downstream of the control valve 200 increase sufficiently to drop the pressure in the downstream conduit, then as a result of the control of the pilot valve assembly 116, a portion 248c of the diaphragm 248 proximate the plug 268a will start to be deflected and rise to a second, or open position. If raised sufficiently to expose the first concentric row 300a of apertures 304a in the throttle plate 232, the condition shown in FIG. 14 will exist, wherein fluid flow passes through the apertures 304a residing in the innermost or first concentric row 300a. Fluid flow passing through the relatively small apertures 304a in the first concentric row 300a advances through the apertures 1304a and 1314a of the underlying flow control plates 1324 and 1325, respectively (the apertures 1304a and 1314a each corresponding to apertures 504a of row 500a in FIG. 5) shown in FIG. 14.

For the example shown in FIGS. 13-15, two spacers or rings 900a and 900b (each corresponding to ring 900 illustrated in FIG. 9) are used as the lower elements in the plate stack 225. Of course, one having skill in the art will understand that one or more spacer rings may be placed at the top or in the middle or in a combination of positions within the plate stack 225. With reference now to FIG. 15, should demand increase downstream of the control valve 200, the diaphragm 248 may continue to rise, such as to the position shown in FIG. 15, wherein fluid flow also passes through the second concentric row 300b and its apertures 304b. Although not shown, this process may continue until the diaphragm 248 is fully raised to expose the outermost concentric row, such as concentric row 300d for the example structure shown in FIGS. 13-15.

Figure 16:
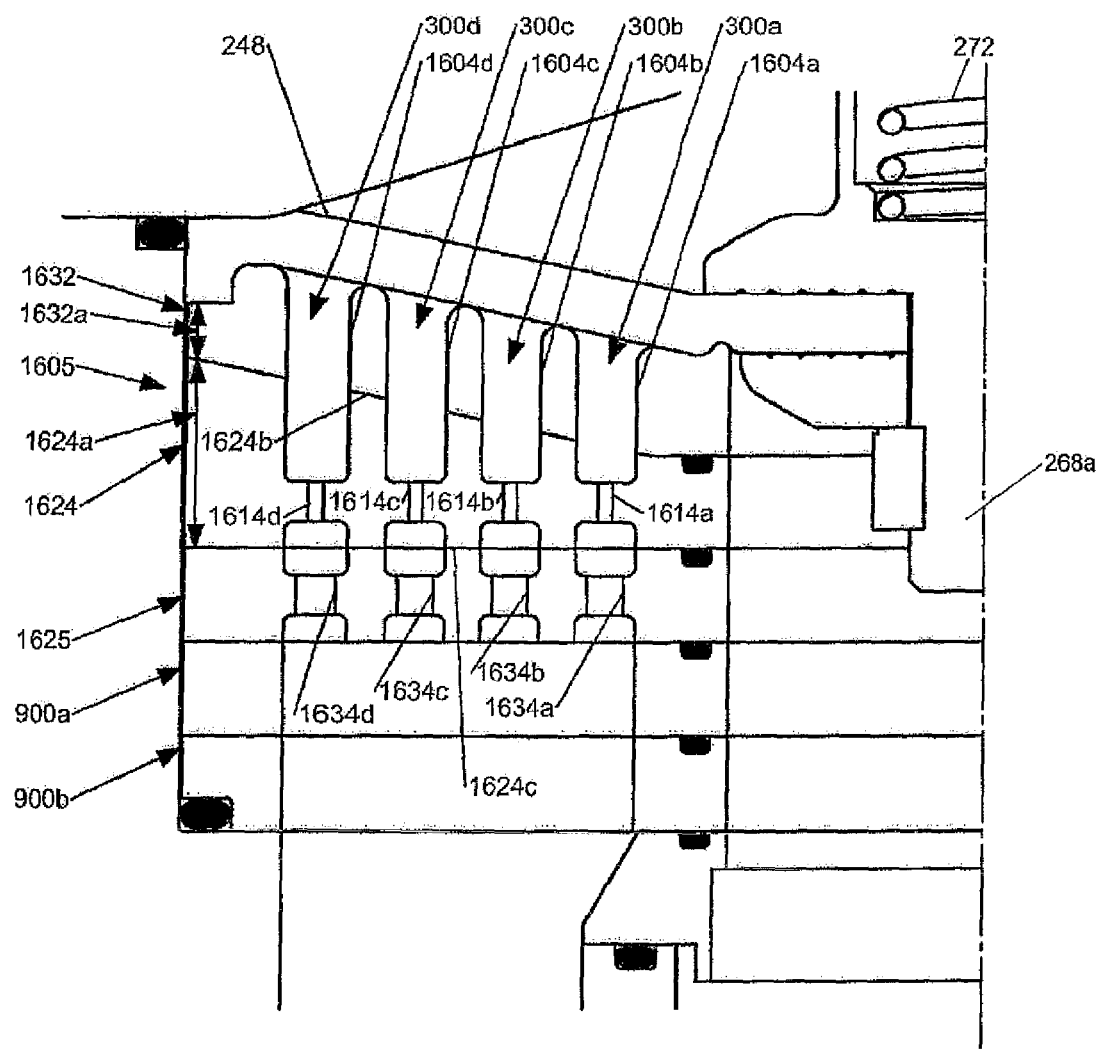
FIG. 16 is a cut-away side elevation view of an alternate configuration of a portion of the throttle plate and the flow control plates and related structures in accordance with at least one embodiment, wherein the diaphragm is in a closed position.

Referring now to FIG. 16, and in accordance with at least one embodiment of the one or more present inventions, an alternate configuration of the stack of plates 1625 that includes a throttle plate 1632 with apertures 1604a-d, a flow control plate 1624 with apertures 1614a-d and flow control plate 1625 with apertures 1634a-d, and two rings 900a and 900b (each corresponding to ring 900 illustrated in FIG. 9) is shown. The throttle plate 1632 has substantially uniform thickness 1632a, and the underlying first flow control plate 1624 has a varying thickness 1624a, as well as a sloping upper surface 1624b and a substantially planar lower surface 1624c. In other words, a variety of plate configurations can be selected based on the desired responsive characteristics of the valve for the fluid and system, such as the rate at which the valve returns to a balanced condition, flow rates, noise reduction, and other factors.

For FIGS. 13-16 described above, the location and size of the plug 268a and the biasing member, such as coil spring 272a are for orienting the reader, and are not meant to be to scale or structurally representative of the plug 268 or biasing member like coil spring 272 of FIGS. 2A-2C.

The diaphragm 248 may be made of any one of several different types of materials. By way of example and not limitation, the diaphragm 248 may be made of rubber, nitrile and polyester, or fluoroelastomer, polyester or other elastic materially, such as Viton, EPDM, Hydrin, and the like and can be reinforced with fabric, such as Kevlar, nylon, fiberglass, or other similar materials to improve the strength and durability of the diaphragm 248. Diaphragms 248 using materials with different durometer values may be used with the control valve 200.

In accordance with at least one embodiment of the one or more present inventions, a filter mechanism 205, such as a stainless steel wire screen illustrated in dotted line in FIG. 2A, can be used within a portion of the control valve 200 to prevent clogging. In one embodiment of control valve 200, the filter mechanism 205 could be used in lieu of a spacer 900 so that it may be easily accessed and removed for cleaning as will be described below.

In at least one embodiment, the flow control plates 224 comprise a substantially round shape in top plan view, such as the flow control plate 224 depicted in FIG. 5. Alternatively, the flow control plates 224 may comprise an alternative shape, such as oval, triangular, rectangular, or other geometric shape, and can include eccentric shapes, such as having the center hole 224e offset a selected distance from the center of the flow control plate 224. Such configurations can be used to vary the distance from a center of the diaphragm 248 to the various rows 500a-d of apertures 504a-d residing on a flow control plate 224.

Embodiments of the one or more present inventions are suited for controlling noise generated by a control valve 200 when adjusting the flow in a conduit. In one or more embodiments, control of noise can be achieved by using a number of flow control plates 224, wherein the actual number of stacked flow control plates 224 used is based on an engineering decision governed, at least in part, by the desired flow rate, valve size, and allowable noise constraints. In addition, the flow plates 224 with varying sizes and layouts of the apertures 504a-d (illustrated in FIG. 5) can be used to mitigate and/or minimize the noise generated by the fluid in the pipeline passing through a control valve 200. For example, alternative layouts of the apertures 504a-d include layouts or patterns that are non-linear, randomly distributed, non-uniformly distributed, vary on a prime number (1, 3, 5, 7, etc.), Fibonacci's sequence, based on the row 500a-d in which the aperture lies, and other patterns known in the art. In addition, the thickness of each flow control plate 224 used in a control valve 200 can vary. For example, control plate 224a shown in FIG. 2A may be either thicker, thinner, or the same thickness as flow control plate 224(b), or be made of different materials. Likewise, flow control plates 224 of varying dimensions and aperture 504a-d layouts can be used to control, minimize, and/or mitigate potentially harmful harmonic noise and resonance within the control valve 200. Further, the size of the interior chamber 216 and outlet 208 may be of the same dimensions, larger, or smaller than the dimensions of the inlet 204, as desired. For example, an outlet 208 that is of larger dimensions and, consequently, a larger flow area, contributes to a desired reduction in the pressure of the fluid within the outlet 208 relative to the upstream pressure in the inlet 204 and a reduction in noise of the fluid flowing through the conduit 208

Embodiments of the one or more present inventions also include combinations of one or more elements of the control valve 200 described herein. By way of example, the throttle plate 232 and one or more flow control plates 224 of one or more varieties may be used with different diaphragms 248 to control the flow characteristics of fluid through the control valve 200.

In addition, a given control valve 200 can be repaired or its flow characteristics changed quite simply. That is, with a control valve 200 in which the flow of the fluid is stopped and the pressure within the control valve 200 relieved, a user may remove the fasteners 264 from the control valve 200 (FIGS. 2A-C) using suitable tools, like a socket wrench when fasteners 264 are bolts. Upon removal of the fasteners 264, the user may then remove or disconnect line 119 from the valve cover 256 using suitable tools. The valve cover 256 may then be removed by lifting it off of the valve body 212. The user may then remove and replace any one or more of the diaphragm 248, the throttle plate 232, and any one or more of the flow control plates 224 and rings 900, if present. Thereafter, the user checks and replaces seals or o-rings, such as o-ring 252, and then replaces the valve cover 256 and reinstalls the line 119 and the bolts 264 using traditional installation techniques. It should be noted that the repair or reconfiguration can be easily effected in the field. For example, if the system is a gas pipeline and the methane gas flowing through the control valve 200 is now obtained from a different source with different fluid characteristics, one or more control valves 200 can be reconfigured with new diaphragms 248, throttle plate 232, flow control plates 224, and rings 900 to produce the desired flow response and characteristics Embodiments of the present invention are also directed at methods of controlling a flow of fluid in a conduit using a control valve 200 as described herein. In use, a control valve 200 for locating in fluidic communication with the conduit is provided, wherein the control valve 200 includes a plurality of plates having a plurality of concentrically located rows of apertures. In at least one embodiment, an uppermost plate of the plurality of plates contacts a moveable diaphragm 248 for selectively allowing fluid flow through the plurality of flow control plates. The opening and closing of the diaphragm 248 is controlled, in part, by a pilot valve assembly 116 in fluidic communication with the conduit (either conduit 204 or conduit 208, depending on the configuration of the pilot valve assembly 116) and the control valve 200 via orifice 121 in fluidic communication with the loading chamber 249. In accordance with one or more methods of the one or more present inventions, a further step may comprise allowing the control valve 200 to be installed in-line with the conduit. An additional step comprises adjusting a flow of fluid in the conduit using the control valve 200, wherein when the pilot valve assembly 116 in conjunction with a fixed orifice 121 adjusts the pressure in the loading chamber 249 to reflect the pressure in the conduit, thereby adjusting the pressure differential across the diaphragm 248 and causing the diaphragm 248 to at least partially rise from the uppermost plate, that is, the throttle plate 232, to allow the fluid to flow through at least one of the concentric rows of apertures located in the uppermost plate. An additional step may comprise adjusting the pilot valve assembly 116 in order to cause a change in the fluid characteristics within the conduit to which the flow control valve 200 is attached. An additional step may comprise changing one or more of the diaphragm 248, the throttle plate 232 and the stack of flow control plates 224 as well as one or more rings 900 and/or filter mechanisms 205 within the interior chamber 216 of the control valve 200.

One or more embodiments may use flow control plates 224 wherein the apertures within the flow control plates 224 downstream of the throttle plate 232 are successively larger in one or more of the flow control plates 224 further downstream. Accordingly, the use of additional flow control plates 224 and/or the use of apertures of different size within downstream flow control plates 224 may be used to influence the pressure and/or the velocity of the fluid as it passes through the interior chamber 216 and the flow control plates 224 residing therein. Similarly, the dimensions of the interior chamber 216 and outlet 208 may be of the same dimensions, larger, or smaller than the dimensions of the inlet 204, as desired. For example, an outlet 208 that is of larger dimensions and, consequently, a larger flow area, contributes to a desired reduction in the pressure of the fluid within the outlet 208 relative to the upstream pressure in the inlet 204 and a reduction in noise of the fluid flowing through the conduit 208.

Among other things, at least some embodiments of the control valves 200 described herein allow adjustment relatively inexpensive compared to less-adaptable valves known in the art and are self-contained. Additional advantages include that the control valve 200 does not require external power to operate.

The foregoing descriptions of use of the control valve 200 are generally described through the non-limiting example of a pressure regulator or pressure reducing valve system. For such a system, at no flow, that is, when the outlet pressure is greater than the set point of the pilot valve assembly 116, the pilot valve assembly 116 via orifice 121 results in a pressure in the loading chamber 249 that is reflective of the outlet pressure, and the diaphragm 248 is fully seated against the throttling plate 232. As demand for flow occurs in the downstream system, the outlet pressure drops, causing the pilot valve assembly 116 to communicate a pressure reflective of the outlet pressure to the loading chamber 249 via the orifice 121, thereby reducing the loading pressure above the diaphragm 248, which then allows inlet pressure to progressively lift the diaphragm 248 off the throttle plate 232, thereby opening the control valve 200 and satisfying the demand for flow in the downstream system. When demand for flow ceases or is reduced, the downstream pressure increases, causing the pilot valve assembly 116 to adjust the pressure in the loading chamber 249 to be reflective of the downstream pressure, which then allows the diaphragm 248 to seat against the throttle plate 232, closing the control valve 200.

Embodiments of the one or more present inventions also have application as a back pressure regulator and/or relief valve that controls and/or a flow control valve, and typically limits or relieves, upstream pressure and/or flow instead of downstream pressure. Thus, embodiments of the control valve 200 disclosed herein are not limited to the non-limiting example of a pressure reducing application discussed above, but are capable of being used in other applications of which valves of this type are used and with other configurations of pilot valve assemblies as known in the art. For example, the control action in the pilot valve assembly 116 is the reverse of that described above for a pressure reducing valve and the pilot valve assembly 116 is configured for this application as known in the art. For a relief valve at no flow, that is, when the inlet pressure is less than the set point of the pilot valve assembly 116, the pilot valve assembly 116 communicates a pressure reflective of the inlet pressure to the loading chamber 249 via orifice 121. In this condition, the diaphragm 248 is closed tightly against the throttle plate 232. As inlet pressure increases above the set point of the pilot valve assembly 116, the pilot valve assembly 116 communicates a pressure reflective of the increased inlet pressure to the loading chamber 249, thereby reducing the pressure above the diaphragm 248, which allows the inlet pressure to progressively lift the diaphragm 248 off of the throttle plate 232, opening the control valve 200 and limiting or relieving the over-pressure in the upstream system. When upstream pressure decreases sufficiently, the pilot valve assembly 116 adjusts to reflect the reduce pressure in the upstream system in the loading chamber 249, which then allows the diaphragm 248 to seat against the throttle plate 232, closing the control valve 200.

The one or more present inventions, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A fluid control valve for controlling the flow of a fluid under pressure from up stream to down stream, the fluid flow control valve being controlled, at least in part, by a pilot valve assembly in fluid communication with the fluid control valve and operable to sense the fluid pressure upstream or down stream of said fluid control valve and supply sensing fluid reflective of the sensed fluid pressure, said fluid control valve comprising:

a valve body having an interior chamber with an interior chamber wall, an inlet in fluid communication with said interior chamber to supply fluid under pressure to said interior chamber, an outlet in fluid communication with said interior chamber to transmit fluid away from said interior chamber, and a loading chamber within said interior chamber in fluid communication with said pilot valve assembly to receive sensing fluid;

a throttle plate which is solid and sized and shaped to fit in said interior chamber, said throttle plate having a throttle aperture centrally formed in said throttle plate and positioned to be in fluid communication with said inlet, said throttle plate having a plurality of radially spaced annular rows of control apertures radially spaced from said throttle aperture, each of said control apertures having a cross section that together define the throttle plate aperture cross sectional area, said plurality of annular rows of control apertures including a first annular row of first control apertures, each control aperture of said first annular row of first control apertures having a cross sectional area which taken together constitute a first cross sectional area, and said plurality of annular rows of control apertures including a second annular row of second control apertures, said second annular row of second control apertures being spaced radially from said first annular row of control apertures, and each control aperture of said second annular row of control apertures having a cross sectional area which taken together constitute a second cross sectional area that is larger than said first cross sectional area;

a first plate for positioning within said interior chamber proximate said throttle plate, said first plate having a first central aperture sized to register with said throttle aperture, said first plate having a plurality of first plate apertures spaced from said first central aperture, each of said first plate apertures being positioned to be in fluid communication with at least one control aperture, and each first plate aperture having a cross sectional area which taken together constitute a first plate cross sectional area that is larger than said throttle plate aperture cross sectional area;

a diaphragm positioned in said interior chamber, said diaphragm having an upper side together with a portion of said interior chamber wall defining said loading chamber, and said diaphragm having a lower side spaced apart from said upper side, said diaphragm being positioned proximate said throttle plate and operable between a closed position in which said lower side is positioned to inhibit flow through said control apertures plate and an open position in which said diaphragm is displaced away from said throttle plate for the flow of fluid under pressure from said inlet through said throttle aperture and through at least one control aperture to at least one of said first plate apertures to said chamber;

a plug operatively associated with said diaphragm and sized to extend from said diaphragm into said throttle aperture for contact with said fluid under pressure and sized to convert the pressure of said fluid under pressure to a force to urge said diaphragm from said closed position toward said open position; and a biasing member positioned relative to said diaphragm and in said loading chamber for applying a return force with the force of the pressure of said sensing fluid in said loading chamber acting on said upper surface of said diaphragm which combine to urge said diaphragm from said open position toward said closed position.

2. The fluid control valve of claim 1, further including a second plate for positioning within said interior chamber proximate said first plate, said second plate having a second central aperture to register with said first central aperture, said second plate having a plurality of second plate apertures each positioned to be in fluid communication with at least one of said first plate apertures, and each of said second plate apertures having a cross sectional area which taken together constitute a second plate cross sectional area that is larger than said first plate cross sectional area.

3. The fluid control valve of claim 2, wherein said plurality of first plate apertures are formed into a plurality of annular first plate rows radially spaced from each other and said first central aperture, wherein said plurality of first plate rows includes a first plate first row of apertures each having a cross sectional area that together define a first plate first row cross sectional area, wherein said plurality of first plate rows includes a first plate second row of apertures each having a cross sectional area that together define a first plate second row cross sectional area that is larger than the first plate first row cross sectional area.

4. The fluid control valve of claim 3, wherein said plurality of first plate apertures are positioned in annular rows around said first central aperture and wherein said first plate includes a row divider located between two adjacent annular rows of first plate apertures.

5. The fluid control valve of claim 4, further including a channel formed in said row divider for the transmission of fluid through said row divider.

6. The fluid control valve of claim 1, wherein said valve has an axis, wherein said throttle plate has a bottom surface and an upper surface both of which extend outwardly from said axis, and wherein in axial section said upper surface slopes upwardly and outwardly at an angle relative to said bottom surface.

7. The fluid control valve of claim 6, wherein said angle is from about 7 degrees to about 20 degrees.

8. The fluid control valve of claim 1, wherein said throttle plate includes a third annular row of third control apertures each having a cross section which together constitute a third cross sectional area which is larger than said second cross sectional area.

9. The fluid control valve of claim 8, wherein each of said control apertures of said throttle plate is a quadrilateral in cross section.

10. The fluid control valve of claim 1, further comprising a ring devoid of concentric rows of apertures for positioning between said throttle plate and said first plate, said ring having structure to separate said throttle plate from said first plate a selected distance to form at least one chamber there between in fluid communication with said control apertures and said first plate apertures.

11. The fluid control valve of claim 1, wherein said first plate is one of a plurality of stacked plates, and wherein said plurality of stacked plates has a bottom-most plate which contacts a shoulder within said interior chamber of said valve body, said shoulder being located proximate a circumferential edge of said bottom-most plate.

12. The fluid control valve of claim 1, wherein said plurality of annular rows of control apertures are each concentric with said throttle aperture, and wherein a continuous row divider separates two rows of said plurality of concentric rows of apertures.

13. The fluid control valve of claim 11, wherein said throttle plate is formed to be solid with the throttle aperture and said control apertures and wherein said first plate is formed to be solid with said first central aperture and said first plate apertures.

14. The fluid control valve of claim 1, wherein said first plate is one of a plurality of stacked plates, and wherein said plurality of stacked plates and said throttle plate rest against each other and are not fastened to one another or to said valve body by one or more of bolts, pins, rods, screws, clamps, and portions thereof.

15. The fluid control valve of claim 1, wherein said first plate apertures are in concentric rows about said first central aperture.

16. The fluid control valve of claim 2, wherein said plurality of first plate apertures have a first concentric row of apertures which together define a first row aperture cross section, wherein said first plate has a second concentric row of apertures radially spaced from said first row of apertures, each of said apertures of said second concentric row of apertures together define a second row aperture cross section larger than the first row aperture cross section.

17. The flow control valve of claim 1 wherein each control aperture of said radially spaced rows of control apertures is a quadrilateral in cross section.

18. The flow control valve of claim 17 wherein each control aperture of said radially spaced rows of control apertures of said throttle plate has a first edge and wherein said first edge is beveled.

19. The flow control valve of claim 18 wherein each control aperture of said radially spaced rows of control apertures has a second, third and fourth edge and wherein each of said second, third and fourth edges is beveled.

20. The flow control valve of claim 1 wherein said plug has a portion that extends from said diaphragm into said loading chamber.

21. The flow control valve of claim 18 wherein said biasing means is a spring and wherein said portion of said plug is sized to register with said spring.

22. The flow control valve of claim 19 wherein said spring is a coil spring and wherein said portion is a housing cylindrical in shape sized to receive said coil spring.

* * * * *